(12) United States Patent
Honda et al.

(10) Patent No.: US 9,892,490 B2
(45) Date of Patent: Feb. 13, 2018

(54) ELECTRONIC APPARATUS

(71) Applicant: Sharp Kabushiki Kaisha, Osaka-shi, Osaka (JP)

(72) Inventors: Ryoh Honda, Osaka (JP); Kenichi Fujita, Osaka (JP); Yoshinori Kishibe, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/034,197

(22) PCT Filed: Nov. 13, 2014

(86) PCT No.: PCT/JP2014/080025
§ 371 (c)(1),
(2) Date: May 4, 2016

(87) PCT Pub. No.: WO2015/072498
PCT Pub. Date: May 21, 2015

(65) Prior Publication Data
US 2016/0275648 A1    Sep. 22, 2016

(30) Foreign Application Priority Data

Nov. 15, 2013  (JP) .................................. 2013-237153
Aug. 28, 2014  (JP) .................................. 2014-174557

(51) Int. Cl.
*G06T 3/60*    (2006.01)
*H04M 1/02*   (2006.01)
(Continued)

(52) U.S. Cl.
CPC .............. *G06T 3/60* (2013.01); *G06F 1/1618* (2013.01); *G06F 1/1677* (2013.01); *G06F 3/16* (2013.01);
(Continued)

(58) Field of Classification Search
CPC ....... G06T 3/60; G06F 1/1618; G06F 1/1677; G06F 3/16; H04M 1/0214; H04M 1/0216; H04M 1/0245
See application file for complete search history.

(56) References Cited

U.S. PATENT DOCUMENTS 9,128,664 B1 * 9/2015 Tabone ................. G06F 1/1616
2013/0050557 A1   2/2013 Moriyasu
2013/0069989 A1   3/2013 Nagata et al.

FOREIGN PATENT DOCUMENTS

JP   2002-118633 A    4/2002
JP   2002-258982 A    9/2002
(Continued)

OTHER PUBLICATIONS

Official Communication issued in International Patent Application No. PCT/JP2014/080025, dated Feb. 17, 2015.

*Primary Examiner* — Xiao Wu
*Assistant Examiner* — Chong Wu
(74) *Attorney, Agent, or Firm* — Keating & Bennett, LLP

(57) ABSTRACT

In order to distinguish between a state where an upper casing of an electronic device is closed and a state where the upper casing is folded towards its back side, the electronic device having an upper casing (10) and a lower casing (20) that are connected to each other via a hinge (30) is arranged such that: a magnetic axis (12a) passing through a south pole and a north pole of a magnet (12) provided in the upper casing (10) is inclined with respect to a direction vertical to a surface of the upper casing (10) that faces the lower casing (20); and magnetic sensors (A and B) provided in the lower casing (20) distinguish between magnetic fields generated by the magnet (12) in a closed state and magnetic fields generated by the magnet (12) in a tablet state.

14 Claims, 20 Drawing Sheets

(51) Int. Cl.
  *G06F 1/16* (2006.01)
  *G06F 3/16* (2006.01)

(52) U.S. Cl.
  CPC ....... *H04M 1/0214* (2013.01); *H04M 1/0216* (2013.01); *H04M 1/0245* (2013.01)

(56) References Cited

FOREIGN PATENT DOCUMENTS

| | | |
|---|---|---|
| JP | 2004-289412 A | 10/2004 |
| JP | 2006-054751 A | 2/2006 |
| JP | 2006-108982 A | 4/2006 |
| JP | 2013-051535 A | 3/2013 |
| JP | 2013-070194 A | 4/2013 |

* cited by examiner

FIG.7

| State of electronic dictionary | Sensor A | Sensor B |
|---|---|---|
| Closed state | ON | OFF |
| Open state | OFF | OFF |
| Tablet state | OFF | ON |

ELECTRONIC APPARATUS

TECHNICAL FIELD

The present invention relates to an electronic device having two casings. In particular, the present invention relates to an electronic device having two casings that are rotatably connected to each other.

BACKGROUND ART

There has been conventionally known a technique of determining, with use of a magnet and a magnetic sensor, opening and closing of a foldable (openable and closable) electronic device such as an electronic dictionary, a personal computer, or a mobile phone.

Each of (a) and (b) of FIG. 12 illustrates a configuration of a magnet and a magnetic sensor in a conventional electronic device. As shown in FIG. 12, an electronic device 200 has (i) an upper casing 210, having a screen and a magnet 212, which is provided on a plus side of a Z axis and (ii) a lower casing 220, having a magnetic sensor 223, which is provided on a minus side of the Z axis. The upper casing 210 and the lower casing 220 are connected to each other, via a hinge 230.

According to the electronic device 200, in a case where the upper casing 210 and the lower casing 220 are folded (closed), the magnetic sensor 223 of the lower casing 220 detects magnetic fields generated by the magnet 212 of the upper casing 210 (see (a) of FIG. 12). In contrast, in a case where the upper casing 210 is rotated to open, the magnetic sensor 223 does not detect the magnetic fields generated by the magnet 212. This is because the magnetic sensor 223 moves away from the magnet 212 (see (b) of FIG. 12).

There has been recently developed an electronic device having an upper casing 210 that can be folded towards a back side of a lower casing 220. For example, Patent Literature 1 discloses a mobile phone in which an upper casing, having an image display section, can be folded towards both of a front side (dial key side) and a back side (a side opposite to the dial key side) of a lower casing having dial keys.

Patent Literature 1 further discloses a technique of determining (i) opening and closing of an electronic device and (ii) a state where the upper casing is folded towards a back surface of a lower casing. Such a technique is realized by a configuration in which (i) a magnetic sensor is provided at a position where magnetic fields are generated in a case where an image display section of the upper casing is folded towards a dial key side and (ii) another magnetic sensor is provided at a position where magnetic field are generated in a case where the image display section is folded towards a side opposite to the dial key side.

CITATION LIST

Patent Literature

[Patent Literature 1]
Japanese Patent Application Publication Tokukai No. 2002-118633 (Publication date: Apr. 19, 2002)
[Patent Literature 2]
Japanese Patent Application Publication Tokukai No. 2004-289412 (Publication date: Oct. 14, 2004)

SUMMARY OF INVENTION

Technical Problem

Some of such conventional foldable electronic devices are designed such that an upper casing 210 is rotatable by about 360 degrees with respect to a lower casing 220. (c) of FIG. 12 illustrates a state where the upper casing 210 is further rotated, from an opened state (see (b) of FIG. 12) to a state where the upper casing 210 is folded towards a back side (towards a minus side of the Z axis) of the lower casing 220.

However, in such a case where the upper casing 210 is rotatable by about 360 degrees with respect to the lower casing 220, (i) a position of a magnet 212 with respect to the lower casing 220 in a state where the upper casing 210 of the electronic device 200 is closed (see (a) of FIG. 12) is identical, in an X-Y coordinate system, to (ii) a position of the magnet 212 with respect to the lower casing 220 in a state where the upper casing 210 is folded towards the back side of the lower casing 220 (see (c) of FIG. 12). It follows that, according to the electronic device 200, a magnetic sensor 223 will respond (i) in a state where the upper casing 210 is closed and (ii) in a state where the upper casing 210 is folded towards the back side of the lower casing 220. The electronic device 200 thus cannot distinguish between the states (i) and (ii).

In a case where an electronic device has an upper casing that is rotatable by about 360 degrees and is foldable, the electronic device cannot distinguish between (i) a state where the upper casing is closed and (ii) a state where the upper casing is folded towards a back side of a lower casing, even if the electronic device employs the configuration of the magnet and the magnetic sensor in the conventional electronic device.

According to the technique disclosed in Patent Literature 1, it is possible to distinguish, with use of two magnetic sensors, between two states. This is because (i) positions where magnetic fields are generated in a case where the image display section of an upper casing is folded towards a dial key side differ from (ii) positions where magnetic fields are generated in a case where the image display section is folded towards a side opposite to the dial key side. However, unlike the mobile phone disclosed in Patent Literature 1, the electronic device having an upper casing that is rotatable by about 360 degrees causes no deviation in coordinate position of (i) a state where the mobile phone is closed and (ii) a state where the mobile phone is folded. Therefore, even in a case where the technique of Patent Literature 1 is applied to the electronic device having an upper casing that is rotatable by about 360 degrees, it is still impossible to appropriately distinguish between a state where the electronic device is closed and a state where the electronic device is folded.

The present invention is attained in view of the above problems. An object of the present invention is to provide an electronic device that can distinguish between a state where an upper casing of the electronic device is closed and a state where the upper casing is folded towards a back side of a lower casing.

Solution to Problem

In order to attain the above object, an electronic device according to an aspect of the present invention includes: a first casing, having a plate-like shape, including a magnet having a magnetic axis that passes through a south pole and a north pole of the magnet; and a second casing, having a plate-like shape, including a magnetic detection section that detects magnetic fields generated by the magnet, a first state indicating a state where a first surface of the first casing and a second surface of the second casing overlap each other, a second state indicating a state where a surface opposite to the first surface and a surface opposite to the second surface overlap each other, in each of the first state and the second state, the magnetic axis of the magnet being inclined with respect to the second surface of the second casing that faces the first casing.

Advantageous Effects of Invention

According to an aspect of the present invention, it is possible to distinguish between a state where an electronic device is closed and a state where the electronic device is folded.

BRIEF DESCRIPTION OF DRAWINGS

FIG. 7 illustrates an example of relationships between each state of the electronic dictionary and output signals of respective two magnetic sensors.

DESCRIPTION OF EMBODIMENTS

Figure 1:
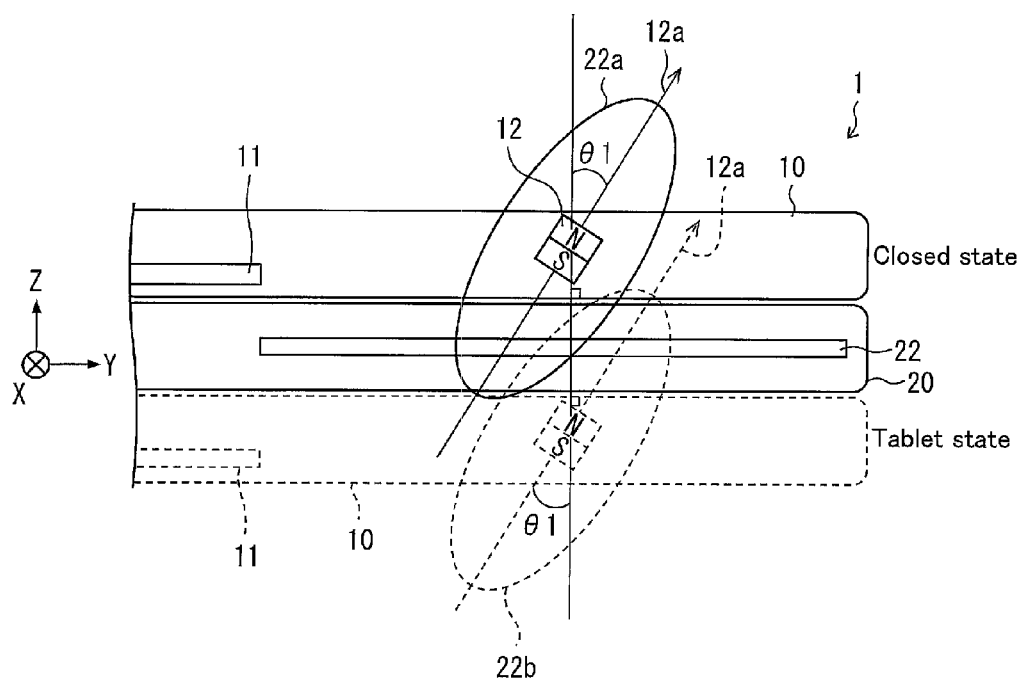
FIG. 1 schematically illustrates an example of how a magnet is provided in an electronic dictionary of Embodiment 1 of the present invention and how magnetic fields are generated by the provision.

A present embodiment will discuss a case where the present invention is made a reduction to practice in an electronic dictionary. Hereafter the electronic dictionaries refer to the ones which search for and display contents of, for example, dictionaries and encyclopedias that are stored in tangible storage mediums and/or on a network. Note, however, that application of the present invention is not limited to an electronic dictionary. The present invention is also applicable to any electronic devices such as, for example, a tablet PC, an electronic notebook, a portable video game device, a smartphone, and a mobile phone. Note that the electronic notebook is a device that includes a touch panel and that can store, for example, handwritten characters entered via a stylus or the like. That is, the electronic notebook is one that has functions of an electronic notebook.

Embodiment 1

The following description will discuss Embodiment 1 of the present invention with reference to FIG. 1 through FIG. 9. Note that shapes and dimensions such as length, size, and width illustrated in the drawings do not reflect actual shapes and dimensions, and have been therefore modified as appropriate for clear and simple illustrations.

<<Configuration of Electronic Dictionary>>

Figure 2:
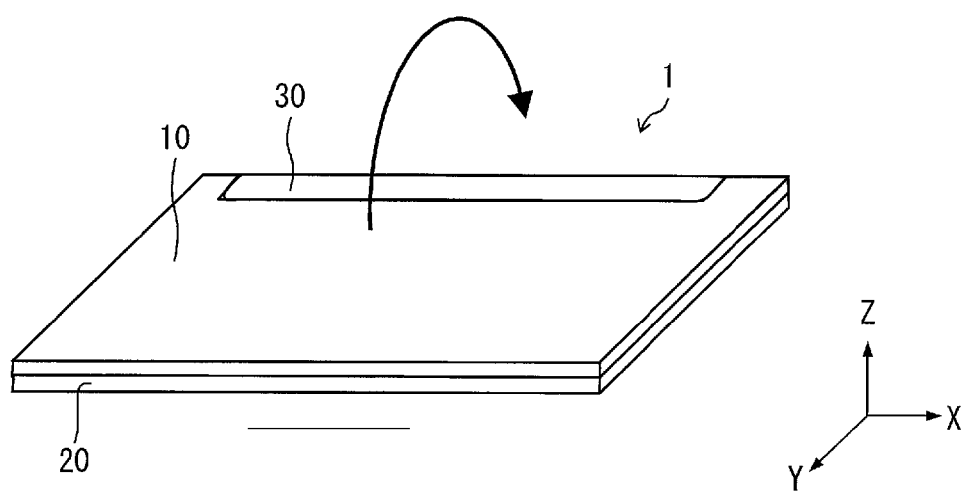
FIG. 2 is a perspective view illustrating an example appearance of the electronic dictionary being in a closed state.
Figure 3:
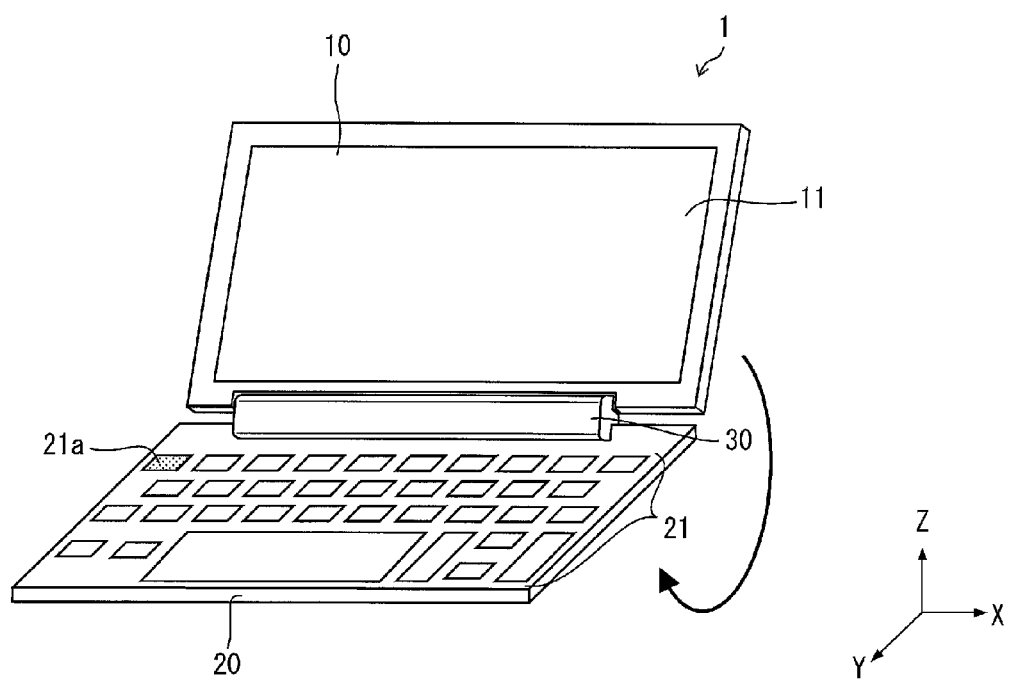
FIG. 3 is a perspective view illustrating an example appearance of the electronic dictionary being in an open state.
Figure 4:
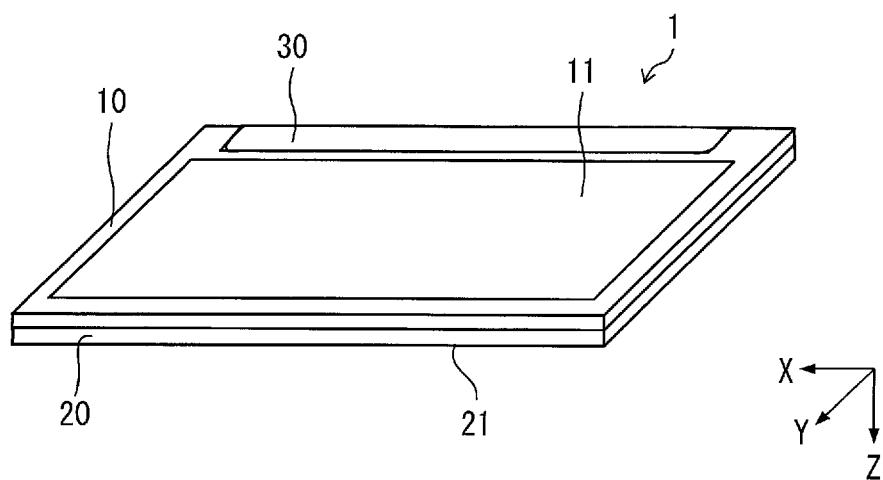
FIG. 4 is a perspective view illustrating an example appearance of the electronic dictionary being in a tablet state.

The following description will first discuss an outer structure of an electronic dictionary 1 (electronic device) of Embodiment 1 with reference to FIGS. 2 through 4. In view of simplification of description, members that are not directly related to Embodiment 1 are omitted in the drawings. Note, however, that the electronic dictionary 1 can include such omitted members in accordance with actual conditions of implementation.

FIG. 3 is a perspective view illustrating an appearance of the electronic dictionary 1. As shown in FIG. 3, the electronic dictionary 1 includes an upper casing 10 (first casing), a lower casing 20 (second casing), and a hinge 30 (connection section). The upper casing 10 and the lower casing 20 are rotatably connected to each other, via the hinge 30. The lower casing 20 includes a keyboard 21 (operation section). The upper casing 10 includes a touch panel 11 (display section).

The upper casing 10 is a casing, having a plate-like shape, which protects members (for example, a magnet, which will be later described) included in the upper casing 10. The lower casing 20 a casing, having a plate-like shape, which protects members (for example, a substrate and a magnetic sensor, each of which will be later described) included in the lower casing 20. Examples of a constituent material of the upper casing 10 and the lower casing 20 each include a synthetic resin.

The touch panel 11 is a touch panel in which (i) a display section that displays image data and (ii) an input section that accepts a touch input are integrated with each other. The touch panel 11 can accept a touch input in a tablet state (later described). Note that the touch panel 11 can be a display section merely having a display function. The touch panel 11 is provided on a first surface of the upper casing 10.

The keyboard 21 is an input device via which the electronic dictionary 1 accepts an entering operation of a user. Embodiment 1 employs a physical keyboard as the keyboard 21. However, the keyboard 21 is not limited as such and can therefore be a planate input device such as a software keyboard displayed on a touch panel.

The keyboard 21 further includes a power key 21a (switching section). The power key 21a is a button or a switch that switches between activation and shutdown (on and off) of the electronic dictionary 1. Note that, according to Embodiment 1, the power key 21a is part of the keyboard 21, but the power key 21a is not limited as such. Alternatively, the power key 21a can be provided independently of the keyboard 21. For example, the power key 21a can be provided on a side surface of the upper casing 10 or of the lower casing 20 (i.e., a surface of the upper casing 10 or of the lower casing 20 which surface is substantially parallel to an X-Z plane or a Y-Z plane).

The hinge 30 is a connection section around which the upper casing 10 can be rotated by about 360 degrees with respect to the lower casing 20 (or vice versa). The hinge 30 is not limited to a particular type. Examples of the hinge 30 encompass a biaxial hinge and a 360-degree hinge. According to the electronic dictionary 1, the hinge 30 rotates in a case where the upper casing 10 receives a force along a rotation direction of the hinge 30. The hinge 30 can be kept at any angle by which the hinge 30 has been rotated. This allows a user of the electronic dictionary 1 to adjust an angle of the upper casing 10 with respect to the lower casing 20 to a target angle, by rotating the upper casing 10 (i.e., by rotating the hinge 30 which is connected to the upper casing 10).

Hereinafter, for convenience, (i) a surface of the upper casing 10 in which surface the touch panel 11 is exposed will be referred to as a "display surface," (ii) a surface opposite to the display surface will be referred to as an "upper surface," (iii) a surface of the lower casing 20 in which surface the keyboard 21 is exposed will be referred to as an "operation surface," (iv) a surface opposite to the operation surface will be referred to as a "bottom surface," (v) a direction extending from the bottom surface towards the operation surface of the lower casing 20 will be referred to as a plus direction of a Z axis, and (vi) a plane that is orthogonal to the Z axis will be referred to as an X-Y plane.

In Embodiment 1, the lower casing 20 includes the keyboard 21 on a plus side of the Z axis. The upper casing 10 includes the touch panel 11 on a first surface that is connected, via the hinge 30, to a second surface of the lower casing 20 on which second surface the keyboard 21 is provided. A rotation axis of the hinge 30 extends parallel to an X axis direction.

<<State of Electronic Dictionary>>

The following description will discuss, with reference to FIGS. 2 through 4, three states (closed state, open state, and tablet state) of the electronic dictionary 1. The electronic dictionary 1 is a device that can be in any of the three states (forms) such as the closed state (first state), the open state (third state), or the tablet state (second state). FIG. 2 illustrates the electronic dictionary 1 being in the closed state. FIG. 3 illustrates the electronic dictionary being in the open state. FIG. 4 illustrates the electronic dictionary being in the tablet state. Note that FIG. 4 illustrates the electronic dictionary 1 being in the tablet state where (i) upside and downside are turned and (ii) right and left are turned (X-axially and Y-axially).

The closed state is a state where (a) the upper casing 10 is folded on the plus side of the Z axis of the lower casing 20 and (b) the upper casing 10 and the lower casing 20 overlap each other (see FIG. 2). That is, the closed state is a state where (i) the upper casing 10 and the lower casing 20 are substantially parallel to each other and (ii) the display surface of the upper casing 10 and the operation surface of the lower casing 20 face each other.

In the closed state, the display surface of the upper casing 10 is folded while the display surface and the operation surface of the lower casing 20 face and overlap each other. It follows that, in the closed state, the touch panel 11 and the keyboard 21 are covered by the upper casing 10 and the lower casing 20. That is, none of the touch panel 11 and the keyboard 21 is usable in the closed state.

The open state is a state where the upper casing 10 and the lower casing 20 do not overlap each other (i.e., the upper casing 10 and the lower casing 20 are not folded) (see FIG. 3). That is, the open state is a state where the upper casing 10 and the lower casing 20 are in transition from the closed state to the tablet state or from the tablet state to the closed state. In other words, the open state is a state that is neither the closed state nor the tablet state.

In an open state, the upper casing 10 is (i) at an angle with and not parallel to the lower casing 20 or (ii) flush with the lower casing 20.

The tablet state is a state where (i) the upper casing 10 is folded towards the minus side of the Z axis of the lower casing 20 and (ii) the upper casing 10 and the lower casing 20 overlap each other (see FIG. 4). That is, the tablet state is a state where (i) the upper casing 10 and the lower casing 20 are substantially parallel to each other and (ii) a surface opposite to the display surface of the upper casing 10 and a surface opposite to the operation surface of the lower casing 20 face each other. In the tablet state, the upper surface of the upper casing 10 is folded while the upper surface of the upper casing 10 and the bottom surface of the lower casing 20 face and overlap each other.

The closed state and the tablet state can also be rephrased as follows. The closed state is a state where a first surface of the upper casing 10 and a second surface of the lower casing 20 overlap each other. The tablet state is a state where a surface opposite to the first surface of the upper casing 10 and a surface opposite to the second surface of the lower casing 20 overlap each other.

Note that in the tablet state, the touch panel 11 is exposed in a surface (a surface on the minus side of the Z axis) of the electronic dictionary 1, whereas the keyboard 21 is exposed in another surface (a surface on the plus side of the Z axis) of the electronic dictionary 1. According to Embodiment 1, an entering operation is carried out, in the tablet state, via the touch panel 11. This is because the keyboard 21 is located on an opposite side of the touch panel 11.

As is clear from above, the electronic dictionary 1 only needs to have an outer structure that can be in any of the three states of the closed state, the open state, and the tablet state. Furthermore, it is desirable that the electronic dictionary 1 be capable of adjusting, in accordance with the three states, respective various types of control such as a display process and an entering process. According to an example configuration of Embodiment 1, the electronic dictionary 1 controls switching, in accordance with any of the three states, (i) between activation and shutdown (power-on and power-off) thereof and (ii) between enablement and disablement of a key operation entered via the keyboard 21. Note that Embodiment 1 is not limited as such. Alternatively, the electronic dictionary 1 can carry out different control.

Note that the following description will discuss a case where the electronic dictionary 1 is in the closed state, the open state, or the tablet state in response to the rotation of the upper casing 10. Note, however, that the electronic dictionary 1 can alternatively be configured such that the lower casing 20, instead of the upper casing 10, rotates around the rotation axis of the hinge 30.

<<Inner Structure of Electronic Dictionary>>

Figure 5:
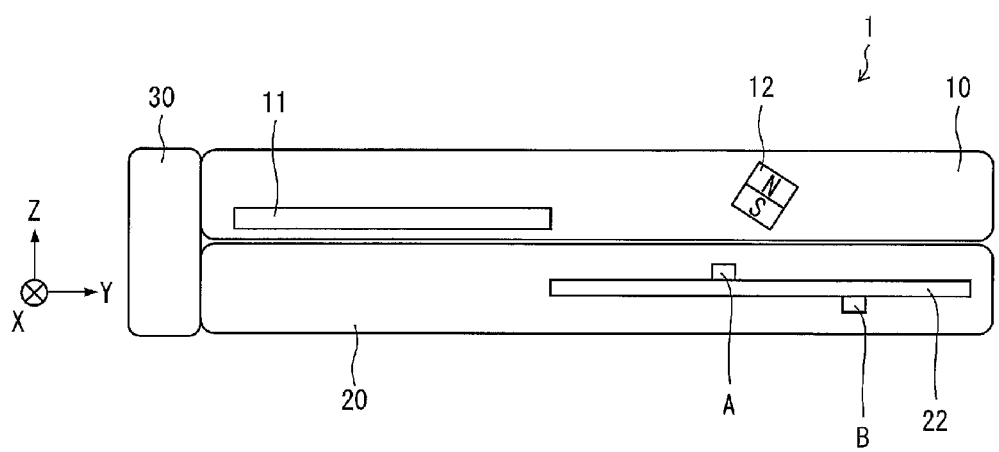
FIG. 5 is a cross-sectional view, as taken along a Y-Z plane, illustrating an example configuration of the electronic dictionary being in a closed state.

The following description will discuss an inner structure of the electronic dictionary 1 with reference to FIG. 5. FIG. 5 is a cross-sectional view of the electronic dictionary 1, as taken along a Y-Z plane. As illustrated in FIG. 5, the magnet 12 is included in the upper casing 10, and a substrate 22 is included in the lower casing 20. There are provided on the substrate 22 a magnetic sensor A (magnetic detection section) and a magnetic sensor B (magnetic detection section).

There are provided on the substrate 22 components such as (i) the magnetic sensors A and B and (ii) an integrated circuit that processes signals supplied from the respective magnetic sensors A and B. The substrate 22, having a plate shape, is provided so as to be substantially parallel to the operation surface of the lower casing 20.

The magnet 12 generates magnetic fields. As illustrated in FIG. 5, the magnet 12 is provided such that a magnetic axis 12a, which passes through a south pole and a north pole of the magnet 12, is inclined with respect to a vertical surface (Z axis) of the upper casing 10. Note that the magnet 12 is not particularly limited in type, provided that the magnet 12 can be included in the upper casing 10 and can be provided so as to be inclined with respect to the Z axis.

The magnetic sensors A and B each can detect magnetic fields in a given direction. Examples employed as the magnetic sensors A and B encompass hall sensors and magneto-resistive (MR) sensors.

The hall sensor is a sensor that employs, for example, a hall integrated circuit or a linear hall integrated circuit. The hall sensor can detect magnetic fields in a direction vertical to the hall sensor. The hall sensor is classified into three types, depending on directions of detectable magnetic fields. Hereinafter, a hall sensor that detects magnetic fields which are in a direction vertical to the hall sensor and whose directions are headed from a bottom surface of the hall sensor towards an upper surface of the hall sensor will be referred to as an "S sensor." Hereinafter, a hall sensor that detects magnetic fields which are in a direction vertical to the hall sensor and whose directions are headed from an upper surface of the hall sensor towards a bottom surface of the hall sensor will be referred to as an "N sensor". Hereinafter, a hall sensor that detects both of (i) magnetic fields which are in a direction vertical to the hall sensor and whose directions are headed from a bottom surface of the hall sensor towards an upper surface of the hall sensor and (ii) magnetic fields which are in the direction vertical to the hall sensor and whose directions are headed from the upper surface of the hall sensor towards the bottom surface of the hall sensor will be referred as a "bipolar sensor".

The MR sensor is a sensor that employs, for example, a magnetoresistivive effect element. The MR sensor can detect magnetic fields in a direction parallel to the MR sensor. The MR sensor is also classified into three types, depending on directions of detectable magnetic fields.

Specifically, the MR sensor is classified into the following three types: (i) an MR sensor that detects magnetic fields which are in a direction parallel to the MR sensor and whose directions are headed from a right side surface of the MR sensor towards a left side surface of the MR sensor; (ii) an MR sensor that detects magnetic fields which are in a direction parallel to the MR sensor and whose directions are headed from a left side surface of the MR sensor towards a right side surface of the MR sensor; and (iii) an MR sensor that detects both of (a) magnetic fields which are in a direction parallel to the MR sensor and whose directions are headed from a right side surface of the MR sensor towards a left side surface of the MR sensor and (b) magnetic fields which are in a direction parallel to the MR sensor and whose directions are headed from the left side surface of the MR sensor towards the right side surface of the MR sensor.

Embodiment 1 employs (i) the S sensor, which is a kind of hall sensor, as the magnetic sensor A and (ii) the N sensor, which is another kind of hall sensor, as the magnetic sensor B. The magnetic sensor A is provided on a front side of the substrate 22 (on an operation surface side of the lower casing 20) such that a bottom part of the magnetic sensor A (element, integrated circuit) makes contact with the substrate 22. The magnetic sensor B is provided on a back side of the substrate 22 (on a bottom surface side of the lower casing 20) such that a bottom of the magnetic sensor B makes contact with the substrate 22. It follows that the magnetic sensors A and B each detect magnetic fields in a plus direction of the Z axis.

According to Embodiment 1, in a case where each of the magnetic sensors A and B detects the strength of magnetic fields of not smaller than a given field strength threshold, the each of the magnetic sensors A and B supplies, to a control section 100 (later described) of the electronic dictionary 1, an ON signal indicating that the magnetic fields have been detected. Hereinafter, "the magnetic sensor A or B detects magnetic fields of not smaller than the given field strength threshold and then outputs the ON signal" will be rephrased as "the magnetic sensor A (or B) responds." Hereinafter, "the magnetic sensor A or B does not detect the magnetic field of not smaller than the field strength threshold and then supplies no signal" will be rephrased as "the magnetic sensor A (or B) does not respond."

In other words, the magnetic sensors A and B are each a magnetic detection section that detects magnetic fields while distinguishing at least between (i) magnetic fields generated by the magnet 12 in the closed state and (ii) magnetic fields generated by the magnet 12 in the tablet state.

<<How to Provide Magnet and Magnetic Sensor>>

Figure 6:
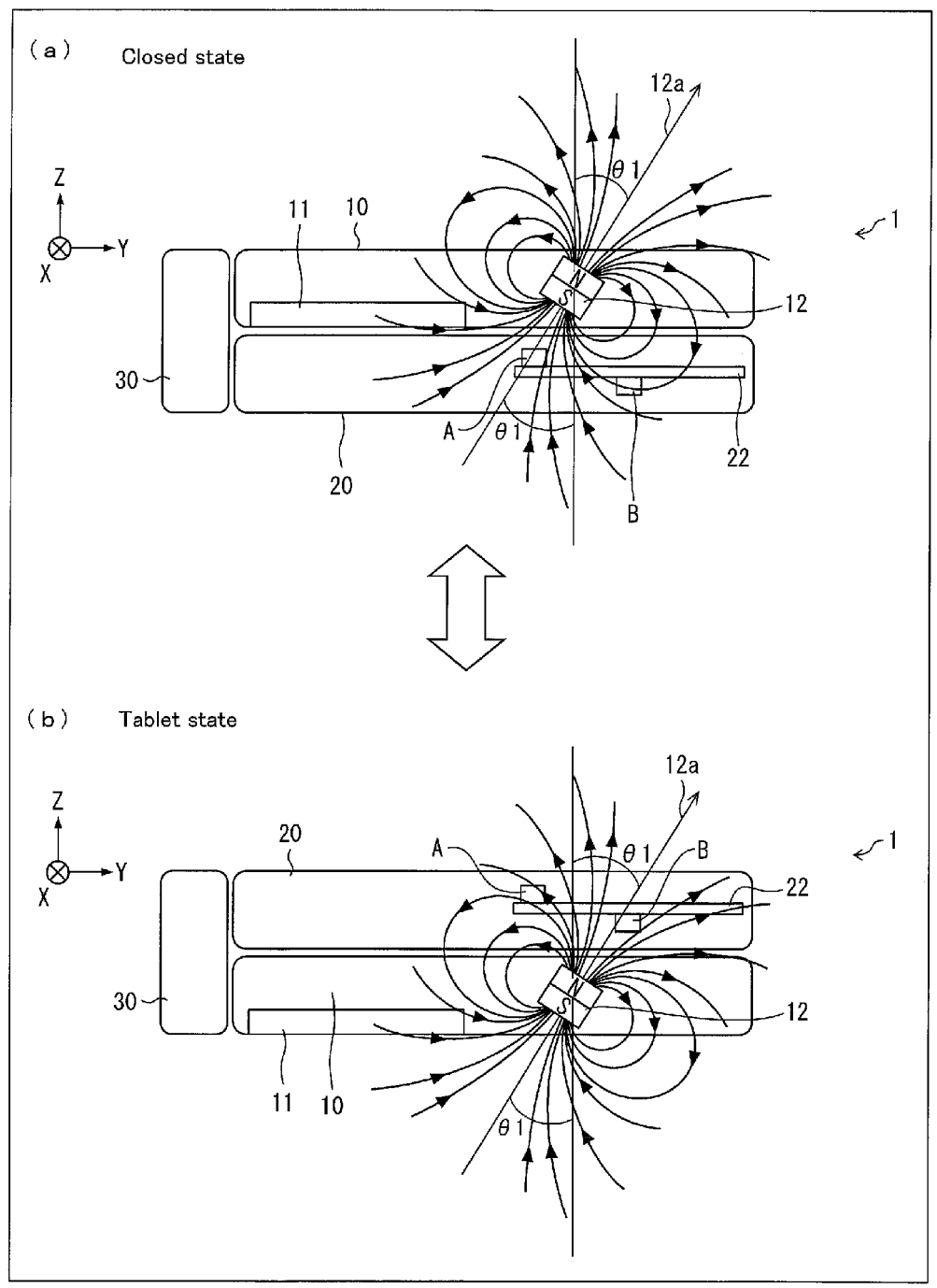
FIG. 6 is a pair of views each illustrating lines of magnetic force caused by the magnet and an example of how a magnetic sensor is provided in the electronic dictionary, (a) of FIG. 6 illustrating the electronic dictionary being in a closed state, and (b) of FIG. 6 illustrating the electronic dictionary being in a tablet state.

The following description will discuss, with reference to FIGS. 1, 6, and 7, how the magnet 12 and the magnetic sensors A and B are provided.

The following description will discuss a concrete example in which the magnetic sensors A and B are provided, with reference to FIGS. 6 and 7. FIG. 6 is a cross-sectional view of the electronic dictionary 1, as taken along the Y-Z plane. FIG. 6 illustrates (i) lines of magnetic force caused by the magnet 12 and (ii) how the magnetic sensors A and B are provided. (a) of FIG. 6 illustrates the electronic dictionary 1 being in the closed state, and (b) of FIG. 6 illustrates the electronic dictionary 1 being in the tablet state.

As illustrated in FIG. 6, the magnet 12 is provided such that the magnetic axis of the magnet 12 is inclined by an angle θ1 with respect to a direction (Z axis direction) vertical to the display surface and the operation surface. Magnetic fields are generated around the magnet 12. Directions of the magnetic fields are indicated by lines of magnetic force each be headed from the north pole of the magnet 12 towards the south pole of the magnet 12. In FIG. 6, the lines of magnetic force are indicated by arrows, and the magnetic axis is indicated by an axis 12a. In other words, the magnet 12 is provided such that in each of the closed state and the tablet state, the magnetic axis 12a, which passes through the south pole and the north pole of the magnet 12, is inclined with respect to a second surface of the lower casing 20 that faces the upper casing 10.

In the upper casing 10, the magnetic axis 12a is inclined with respect a direction (Z axis) vertical to the substrate 22. This causes a change in position of an intersection of the magnetic axis 12a and the substrate 22, depending on whether the electronic dictionary 1 is in the closed state or the in the tablet state. The magnetic sensor A is provided at an intersection of the magnetic axis 12a and the substrate 22 when the electronic dictionary 1 is in the closed state. The magnetic sensor B is provided at an intersection of the magnetic axis 12a and the substrate 22 when the electronic dictionary 1 is in the tablet state.

In other words, (i) the magnetic sensor A is provided substantially on the magnetic axis 12a of the magnet 12 in the closed state and (ii) the magnetic sensor B is provided substantially on the magnet axis 12a of the magnet 12 in the tablet state. The term "substantially on the magnetic axis 12a" herein means a given region around an extension of the magnetic axis 12a in the second surface and an inner portion of the lower casing 20. The term "substantially on the magnetic axis 12a" means, for example, a given region around an intersection of the extension of the magnetic axis 12a and the substrate 22.

Note that FIG. 6 illustrates a case where the magnetic sensors A and B each (i) detect magnetic fields in a plus direction of the Z axis and (ii) are flush with the magnet 12 in the Y-Z plane. The same applies to the subsequent drawings.

In a case where the electronic dictionary 1 is in the closed state, the magnetic sensor A is located on an extension of the magnetic axis 12a of the magnet 12 (see (a) of FIG. 6). In such a case, magnetic fields in the plus direction of the Z axis occur on the magnetic sensor A (see (a) of FIG. 6). In contrast, the magnetic sensor B is located away from the magnet and in a direction vertical to the magnetic axis 12a (see (a) of FIG. 6). This causes magnetic fields to occur on the magnetic sensor B. Specifically, a large amount of magnetic fields in a Y axis direction and a small amount of the magnetic fields in the plus direction of the Z axis occur on the magnetic sensor B. Consequently, in a case where the electronic dictionary 1 is in the closed state, the magnetic sensor A responds, whereas the magnetic sensor B does not respond.

In a case where the electronic dictionary 1 is in the tablet state, the magnetic sensor B is located on the extension of the magnetic axis 12a of the magnet 12 (see (b) of FIG. 6). In such a case, magnetic fields in the plus direction of the Z axis are generated on the magnetic sensor B. In contrast, the magnetic sensor A is located away from the magnet and in the direction vertical to the magnetic axis 12a (see (b) of FIG. 6). This causes magnetic fields to be generated on the magnetic sensor A. Specifically, a large amount of magnetic fields are generated in the Y axis direction and a small amount of the magnetic fields are generated in the plus direction of the Z axis. Consequently, in a case where the electronic dictionary 1 is in the tablet state, the magnetic sensor B responds, whereas the magnetic sensor A does not respond.

Note that, in a case where the electronic dictionary 1 is in the open state, the upper casing 10 and the lower casing 20 are away from each other. In such a case, the strength of magnetic fields generated by the magnet 12 is too weak for the magnetic sensors A and B to detect. Consequently, in a case where the electronic dictionary 1 is in the open state, none of the magnetic sensor A and B responds.

FIG. 7 is a table summarizing (i) states of the magnetic sensors A and B that are provided as shown in FIG. 6 and (ii) states of the electronic dictionary 1. In FIG. 7, a column "STATE OF ELECTRONIC DICTIONARY" indicates states of the electronic dictionary 1, and columns "SENSOR A" and "SENSOR B" indicate the respective states of the magnetic sensors A and B. In FIG. 7, "ON" indicates a state where the magnetic sensor A or B responds, whereas "OFF" indicates a state where the magnetic sensors A or B do not respond.

As has been described, in a case where the electronic dictionary 1 is in the closed state, the magnetic sensor A responds, whereas the magnetic sensor B does not respond (first column of FIG. 7). In a case where the electronic dictionary 1 is in the open state, none of the magnetic sensors A and B responds (second column of FIG. 7). And, in a case where the electronic dictionary 1 is in the tablet state, the magnetic sensor B responds, whereas the magnetic sensor A does not respond (third column of FIG. 7).

As such, the magnet 12, which is inclined by the angle θ1, causes a change in region where the strength of the magnetic fields in the plus direction of the Z axis becomes not smaller than a given value (i.e., a region where the magnetic sensor outputs the ON signal), depending on whether the electronic dictionary 1 is in a closed state or in a tablet state.

The following description will further discuss, with reference to FIG. 1, how the magnet 12 and the magnetic sensors A and B are provided. FIG. 1 schematically illustrates the electronic dictionary 1 as taken along the Y-Z plane. FIG. 1 illustrates a region where the magnetic sensor A responds in the closed state and a region where the magnetic sensor B responds in the tablet state. Note that in FIG. 1, the upper casing 10, the touch panel 11, and the magnet 12 that are being in the closed state are indicated by solid lines, and the upper casing 10, the touch panel 11, and the magnet 12 that are being in the tablet state are indicated by dotted lines.

A region 22a is a region where the strength of the magnetic fields in the plus direction of the Z axis becomes not smaller than a given value (a threshold for causing the magnetic sensors A and B to respond) (i.e., a region where the magnetic sensors A and B respond) in a case where the electronic dictionary 1 is in the closed state. In contrast, a region 22b is a region where the strength of the magnetic fields in the plus direction of the Z axis becomes not smaller than the given value (i.e., a region where the magnetic sensors A and B respond) in a case where the electronic dictionary 1 is in the tablet state. Each of The regions 22a and 22b is a three-dimensional region having a corresponding size (range) determined in accordance with (i) strength of the magnetic fields generated by the magnet 12 (magnetic fields in the plus direction of the Z axis) and (ii) a corresponding detection sensitivity of the magnetic sensors A and B.

Figure 12:
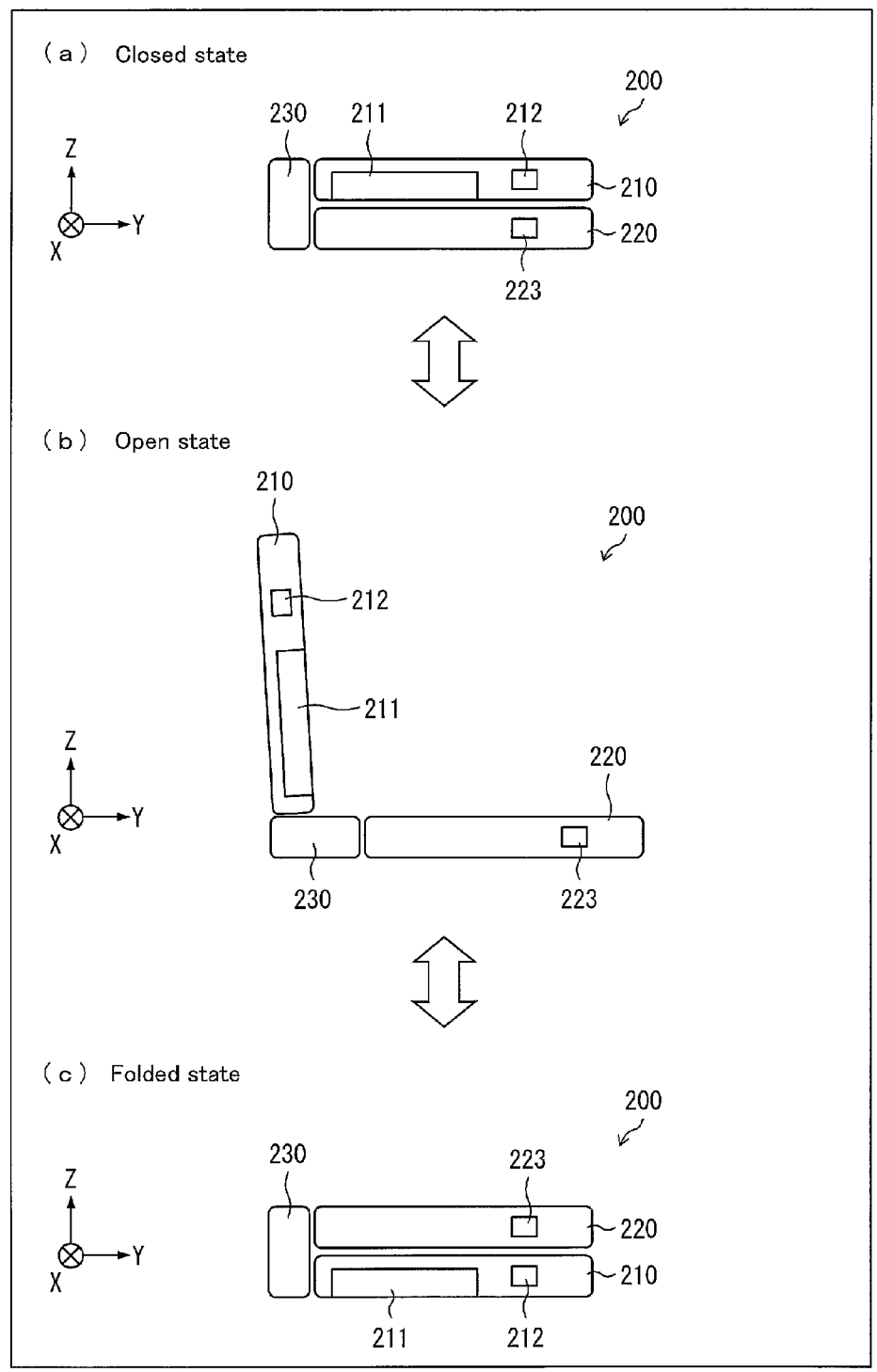
FIG. 12 is a set of views (a) through (c), (a) and (b) of FIG. 12 being cross-sectional views of a conventional electronic dictionary, as taken along the Y-Z plane, and each illustrating how a magnet and a magnetic sensor are provided in the conventional electronic device, (a) of FIG. 12 illustrating a state where a casing is closed, (b) of FIG. 12 illustrating a state where the casing is open, and (c) of FIG. 12 being a cross-sectional view of an electronic dictionary, as taken along the Y-Z plane, having a casing that is rotatable by about 360 degrees and illustrating a state where the casing of the electronic dictionary is folded.

Note that a conventional electronic device is configured such that a magnet 212, which determines a state of the conventional electronic device, is provided vertically to a casing 220 (see (c) of FIG. 12). Consequently, (i) a region where a magnetic sensor 223 responds in a closed state and (ii) a region where the magnetic sensor 223 responds in a folded state, are provided so as to extend in the Z axis direction. It follows that (i) the region where the magnetic sensor 223 responds in the closed state and (ii) the region where the magnetic sensor 223 responds in the folded state, substantially overlap each other in the casing 220.

In contrast, the electronic dictionary 1 of Embodiment is configured such that the magnet 12 is inclined by an angle θ1 with respect to the Z axis direction (see FIG. 1). This causes the regions 22a and 22b to be formed so as to be inclined by the angle θ1 with respect to the Z axis direction. Consequently, the regions 22a and 22b partially overlap each other in the lower casing 20 so as to deviate from each other in the Y axis direction (see FIG. 1). In other words, according to the electronic dictionary 1, the following three regions (1) through (3) are formed in the lower casing 20:

(1) a region where a first magnetic sensor responds in the closed state but does not respond in the tablet state (a part of the region 22a which part is in the lower casing 20 and which part does not overlap the region 22b);

(2) a region where the second magnetic sensor responds in the closed state but does not respond in the tablet state (a part of the region 22b which part is in the lower casing 20 and which part does not overlap the region 22a); and (3) a region where the first magnetic sensor or the second magnetic sensor respond(s) in each of the closed state and the tablet state (a region in which regions 22a and 22b overlap each other in the lower casing 20).

In other words, the region (1) is a region where the strength of the magnetic fields in the plus direction of the Z axis is not smaller than a first given value (a threshold for causing the first magnetic sensor to respond) in the closed state and is smaller than the first given value in the tablet state. The region (2) is a region where the strength of the magnetic fields in the plus direction of the Z axis is not smaller than a second given value (a threshold for causing the second magnetic sensor to respond) in the tablet state and is smaller than the second given value in the closed state. The region (3) is a region where the strength of magnetic fields in the plus direction of the Z axis is not smaller than a third given value (the first or the second given values, whichever is greater) in each of the closed state and the tablet state.

Note that the first given value, which is the threshold for causing the first magnetic sensor to respond, and the second given value, which is the threshold for causing the second magnetic sensor to respond, can be identical to or different from each other. In Embodiment 1, the magnetic sensor A corresponds to the first magnetic sensor, and the magnetic sensor B corresponds to the second magnetic sensor.

Hereinafter, the region (1) will be referred to as a "closed state detection region" (first region), the region (2) will be referred to as a "tablet state detection region" (second region), and the region (3) will be referred to as a "dual state detection region" (third region).

As shown in FIG. 6, the magnetic sensor A is provided in the closed state detection region, and the magnetic sensor B is provided in the tablet state detection region. This causes only the magnetic sensor A to respond in a case where the electronic dictionary 1 is in the closed state, and causes only the magnetic sensor B to respond in a case where the electronic dictionary 1 is in the tablet state (see FIG. 7).

The following description will further discuss how the magnetic sensors are provided in the electronic dictionary 1 configured as described above. Note that the electronic dictionary 1 is not limited to a combination, described in Embodiment 1, of types of magnetic sensors, directions in which the magnetic sensors are provided on the substrate 22, and which surfaces of the substrate 22 the magnetic sensors are provided on, provided that the first and second magnetic sensors are separately provided in at least two of the closed state detection region, the tablet state detection region, and the dual state detection region.

Note that the bipolar sensor, which is a kind of hall sensor, can be employed as the magnetic sensor. Even in a case where the bipolar sensor, which is a kind of hall sensor, is employed, the magnetic sensors will respond in combination as illustrated in FIG. 7. Alternatively, instead of a hall sensor, for example, the MR sensor can also be employed as the magnetic sensor.

Note also that the magnetic sensors are not necessarily provided on the magnetic axis. It is desirable that at least one of the magnetic sensors be provided on the magnetic axis 12a of the magnet 12 in a closed state or in a tablet state. This is because, in a case where the magnetic sensor is provided on the magnetic axis 12a where the strongest magnetic fields are generated, it is possible to detect, with high accuracy, magnetic fields generated in the closed state or in the tablet state.

Note also that, in Embodiment 1, the magnet 12 and the magnet sensors A and B are provided so as to be flush with each other in the Y-Z plane. However, the present invention is not limited as such. Since each of the closed state detection region, the tablet state detection region, and the dual state detection region is a three-dimensional region, the magnet 12 and the magnetic sensors A and B are not necessarily flush with each other in the Y-Z plane, i.e., they can deviate from each other in the X axis direction, provided the magnetic sensors A and B are provided in different regions.

One of the magnetic sensors A and B can be provided in the dual state detection region. In a case where, for example, the magnetic sensor A is provided in the dual state detection region, (i) only the magnetic sensor A outputs an ON signal in the closed state, (ii) both of the magnetic sensors A and B output respective ON signals in the tablet state, and (iii) none of the magnetic sensor A and B outputs an ON signal in the open state.

A plurality of magnetic sensors can be provided in a single region. Magnetic sensors can alternatively be provided in each of the closed state detection region, the tablet state detection region, and the dual state detection region.

Instead of providing on the substrate 22, the magnetic sensors A and B can be provided on the lower casing 20 or can be exposed in the operation surface or the bottom surface of the lower casing 20.

The magnet 12 is not particularly limited in type and polarity direction, provided that the magnet 12 is provided on the upper casing 10 such that the magnet 12 is so inclined (by an angle θ1) with respect to the Z axis as to cause a closed state detection region, a tablet state detection region, and a dual state detection region. For example, in FIGS. 1, 5, and 6, the magnet 12 is provided so that (i) the south pole of the magnet 12 is located on a display surface side of the upper casing 10 and (ii) the north pole of the magnet 12 is located on an upper surface side of the upper casing 10. Note, however, that such polarities of the magnet 12 can be reversed in accordance with (i) how the magnetic sensors A and B are provided or (ii) a direction of lines of detectable magnetic force.

According to the electronic dictionary 1 of Embodiment 1, one or more magnetic sensor(s) is/are provided in each of at least two of the closed state detection region, the tablet state detection region, and the dual state detection region. This allows for making a determination, in accordance with a combination of how the magnetic sensors respond, whether the electronic dictionary 1 is in a closed state, in an open state, or in a tablet state. Note that determination of the open state is not fundamental to the present invention. It is sufficient that at least the closed state and the tablet state can be determined.

<<State Determination Process and Device Control to be Carried Out after State Determination Process>>

Figure 8:
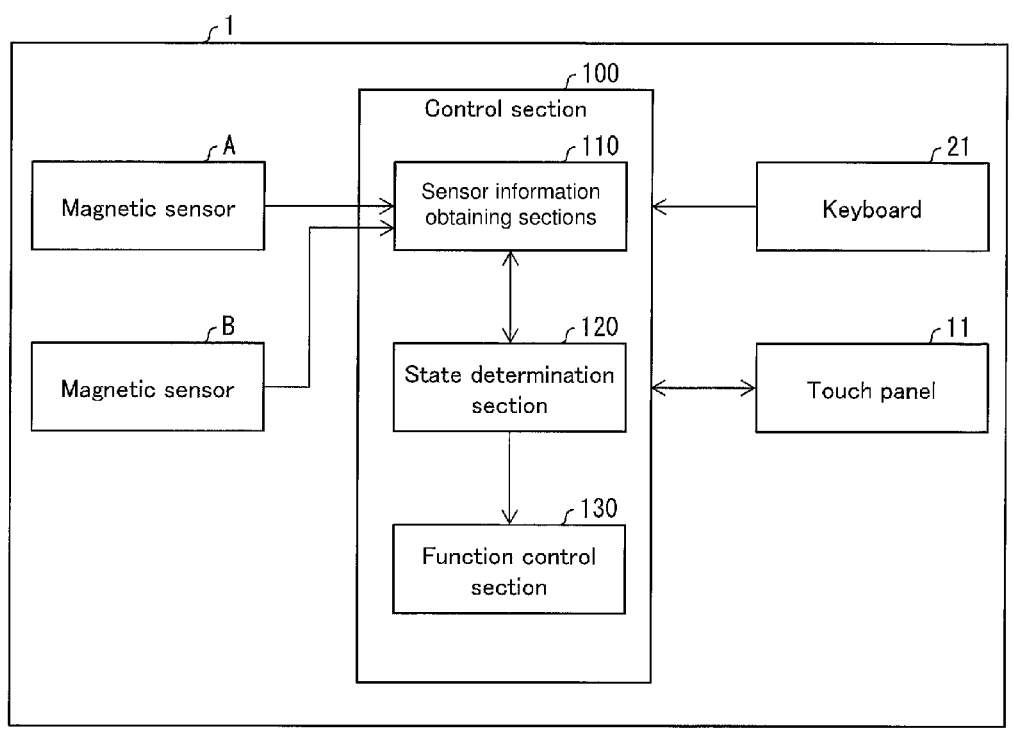
FIG. 8 is a block diagram illustrating an example configuration of the electronic dictionary.
Figure 9:
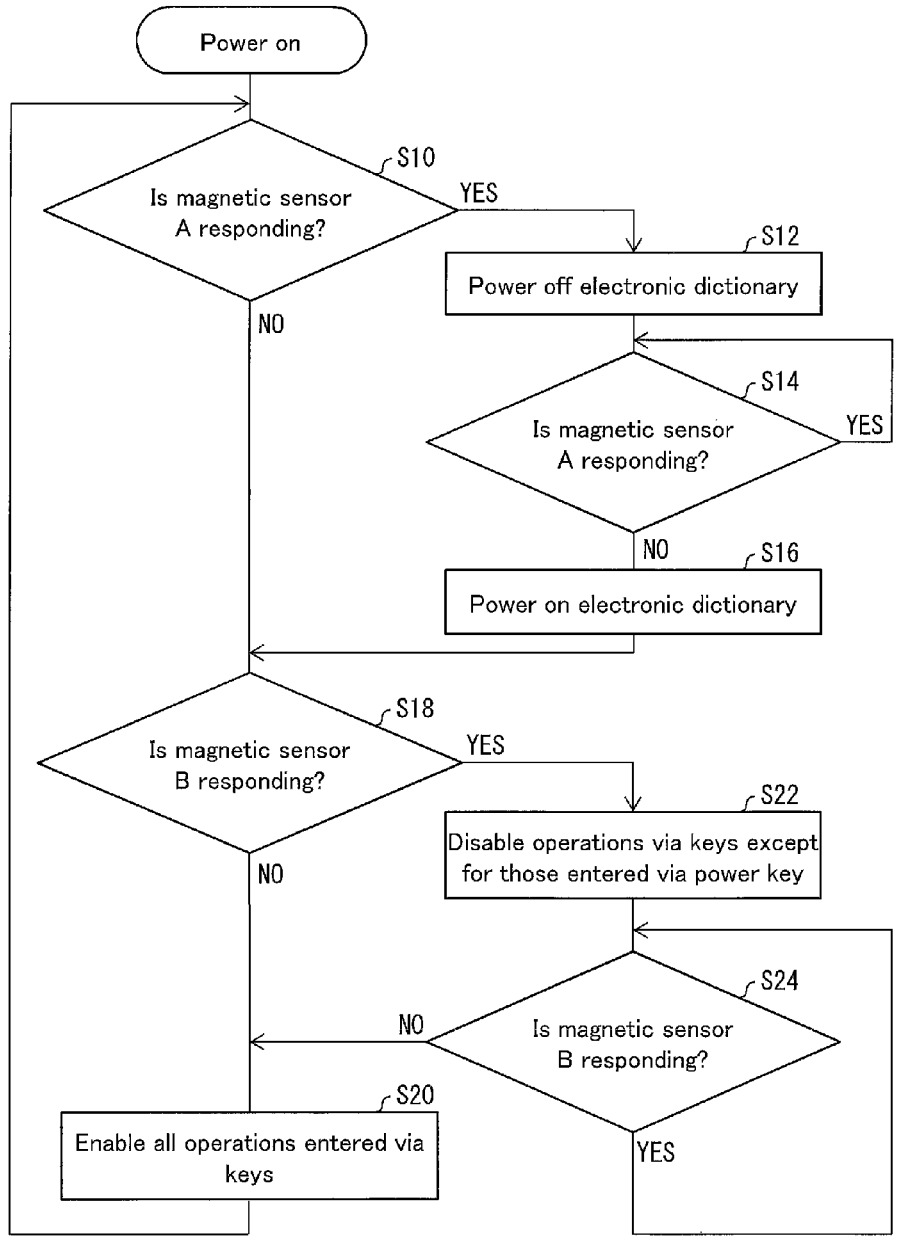
FIG. 9 is a flowchart illustrating an example flow of a state determination process and device control that the electronic dictionary carries out after the state determination process.

The following description will discuss, with reference to FIGS. 8 and 9, (i) a state determination process in which the electronic dictionary 1 determines a state thereof with use of the magnetic sensors A and B and (ii) device control that the electronic dictionary 1 carries out after the state determination process. FIG. 8 is a block diagram illustrating an example configuration of the electronic dictionary 1. The electronic dictionary 1 includes the control section 100, in addition to the magnetic sensors A and B, the keyboard 21, and the touch panel 11 that have been described. Note that the electronic dictionary 1 can further include sections such as a communication section, a storage section, a sound input section, and/or a sound output section. Note, however, that such sections are irrelevant to the features of the invention according to Embodiment 1, and the sections are therefore not illustrated in FIG. 8.

The control section 100 on the whole controls the electronic dictionary 1. The control section 100 includes, as functional blocks, a sensor information obtaining section 110, a state determination section 120, and a function control section 130 (control section).

The sensor information obtaining section 110 obtains signals supplied from the magnetic sensors A and B. Hereinafter, an ON signal supplied from the magnetic sensor A will be referred to as a signal A, and an ON signal supplied from the magnetic sensor B will be referred to as a signal B. The sensor information obtaining section 110 supplies, to the state determination section 120, the signals A and B, which have been respectively supplied from the magnetic sensors A and B.

In accordance with the signals supplied from the magnetic sensors A and B, the state determination section 120 determines whether the electronic dictionary 1 is in a closed state, in an open state, or in a tablet state. Specifically, in a case where the state determination section 120 receives only the signal A from the sensor information obtaining section 110, it determines that the electronic dictionary 1 is in a closed state. In a case where the state determination section 120 receives only the signal B, it determines that the electronic dictionary 1 is in a tablet state. In a case where the state determination section 120 receives none of the signals A and B, it determines that the electronic dictionary 1 is in an open state. The state determination section 120 then supplies a determination to the function control section 130.

Alternatively, the state determination section 120 can determine a state of the electronic dictionary 1 in accordance with whether or not it has received the signal A or B from the sensor information obtaining section 110 at a given timing such as at given time intervals or at a timing of power ON or OFF of the electronic dictionary 1.

According to the configuration of the magnetic sensors A and B in Embodiment 1, the magnetic sensors A and B will never concurrently respond. In other words, the state determination section 120 will never receive both the signals A and B at the same time. This allows the state determination section 120 to determine, in accordance with which one of the signals A and B it has received, whether the electronic dictionary 1 is in a closed state, in an open state, or in a tablet state.

The function control section 130 controls various components of the electronic dictionary 1 in accordance with a determination made by the state determination section 120. Upon receipt of a determination, informing that the electronic dictionary 1 is in a closed state, from the state determination section 120, the function control section 130 powers off the electronic dictionary 1. Upon receipt of a determination, informing that the electronic dictionary 1 is in the open state, from the state determination section 120, the function control section 130 powers on the electronic dictionary 1 and enables operations entered via the keyboard 21. Specifically, the control section 100 controls processes to be carried out in accordance with signals entered via the keyboard 21. Upon receipt of a determination, informing that the electronic dictionary 1 is in a tablet state, from the state determination section 120, the function control section 130 powers on the electronic dictionary 1 and disables operations entered via the keyboard 21, except for those entered via the power key 21a. That is, the function control section 130 controls the control section 100 not to carry out processes in response to a signal entered via the keyboard 21 even if such a signal is entered via the keyboard 21.

Alternatively, in a case where the electronic dictionary 1 is in a closed state, the function control section 130 can control the electronic dictionary 1 to be in a sleep mode (hibernation, stand-by mode), instead of powering off the electronic dictionary 1. Alternatively, in a case where the electronic dictionary 1 is in a tablet state, the function control section 130 can disable all operations caused by keys, such as the power key 21*a*, on the keyboard 21.

The following description will discuss process flow of the state determination process and the device control in the electronic dictionary 1. FIG. 9 is a flowchart illustrating the flow of the state determination process and the device control in the electronic dictionary 1.

According to Embodiment 1, the magnetic sensors A and B will never concurrently respond. Consequently, the state determination section 120 determines a state of the electronic dictionary 1, in accordance with whether (i) it has received any of the signal A and the signal B or (ii) it has received no signal.

In a case where the electronic dictionary 1 is powered on, the state determination section 120 of the control section 100 first determines whether or not it has received a signal A from the sensor information obtaining section 110 (i.e., whether or not the magnetic sensor A responds) (S10). In a case where the magnetic sensor A responds (YES in S10), the state determination section 120 determines that the electronic dictionary 1 is in a closed state. The function control section 130 powers off the electronic dictionary 1 (S12). After that, while the magnetic sensor A continues to respond (YES in S14), the electronic device 1 is kept being powered off. In a case where the sensor information obtaining section 110 receives no signal A (the magnet sensor A does not respond) after the electronic dictionary 1 is powered off (S12) (NO in S14), the function control section 130 powers on the electronic dictionary 1 again (S16).

In a case where the electronic dictionary 1 is powered on, the state determination 120 subsequently determines whether or not it has received a signal B from the sensor information obtaining section 110 (i.e., whether the magnetic sensor B responds) (S18). In a case where the magnetic sensor B does not respond (NO in S18), the function control section 130 determines that the electronic dictionary 1 is in an open state, and enables all operations entered via keys on the keyboard 21 (S20).

In a case where the magnetic sensor B responds in S18 (YES in S18), the function control section 130 determines that the electronic dictionary 1 is in a tablet state, and disables operations entered via the keyboard 21 except for those entered via the power key 21*a* (S22). After that, while the magnetic sensor B continues to respond (YES in S24), the function control section 130 keeps disabling the operations entered via the keys on the keyboard 21 as in S22. In a case where the sensor information obtaining section 110 does not receive the signal B (the magnetic sensor B does not respond) after the determination in S18 is made (NO in S24), the state determination section 120 determines that the electronic dictionary 1 is changed from the tablet state to an open state. The function control section 130 enables all operations caused by keys on the keyboard 21 (S20).

The state determination process and the device control allow the electronic dictionary 1 to distinguish between the closed state, the open state, and the tablet state. The electronic dictionary 1 thus can carry out device control suitable for each of the three states.

Note that, in Embodiment 1, the magnetic sensors A and B will never concurrently respond. Consequently, the state determination section 120 determines, in accordance with which one of the signals it has received, whether the electronic dictionary 1 is in a closed state, in an open state, or in a tablet state. Note, however, that Embodiment 1 is not limited to such determinations.

In a case where, for example, (i) a magnetic sensor A (S sensor or bipolar sensor) is provided in a closed state detection region and (ii) a magnetic sensor B (N sensor or bipolar sensor) is provided in a dual state detection region, (a) both of the magnetic sensors A and B respond in a closed state, (b) only the magnetic sensor B responds in a tablet state, and (c) none of the magnetic sensors A and B responds in an open state. In such a case, the state determination section 120 determines a state of the electronic dictionary 1 in accordance with signals supplied from the respective magnetic sensors A and B, as specified below. That is, (i) in a case where the state determination section 120 has received both of the signals A and B, it determines that the electronic dictionary 1 is in a closed state, (ii) in a case where the state determination section 120 has received only the signal B, it determines that the electronic dictionary 1 is in a tablet state, and (ii) in a case where the state determination section 120 has received none of the signals A and B, it determines that the electronic dictionary 1 is in an open state.

As is clear from above, it is possible to appropriately design a determination process of the state determination section 120 based on how magnetic sensors respond depending on (i) types of magnetic sensors and (ii) location of the magnetic sensors.

Embodiment 2

The following description will discuss Embodiment 2 of the present invention. Note that, for convenience of description, members having functions identical to those of the foregoing embodiment will be given identical reference numerals, and will not be repeatedly described. The same applies to other embodiments that will be described below.

An electronic dictionary 1 of an aspect of the present invention does not necessarily have a dual state detection region. That is, a magnet 12 only needs to be provided on an upper casing 10 such that the magnet 12 is so inclined as to generate a closed state detection region and a tablet state detection region. The following description will discuss, with reference to FIG. 10, how the magnet 12 is provided in Embodiment 2.

Figure 10:
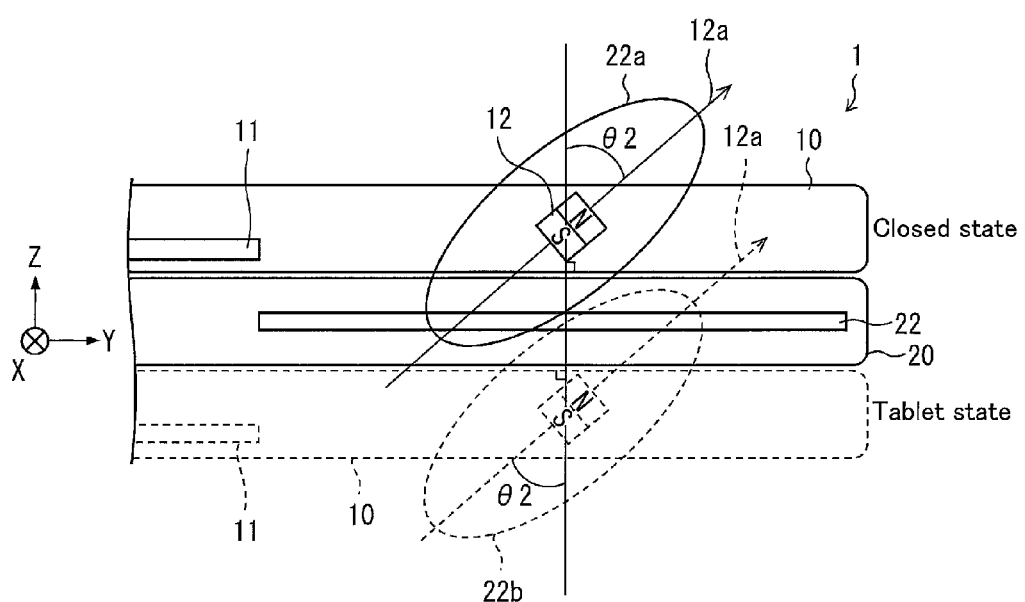
FIG. 10 schematically illustrates an example of how a magnet is provided in an electronic dictionary of Embodiment 2 of the present invention and how magnetic fields are generated by the provision.

FIG. 10 schematically illustrates (i) how a magnet is provided in an electronic dictionary of Embodiment 2 of the present invention and (ii) how magnetic fields are generated by the provision of the magnet. In Embodiment 2, the magnet 12 is provided in a casing such that a magnetic axis of the magnet 12 is inclined by an angle $\theta 2$, which is greater than the angle $\theta 1$, with respect to a Z axis direction. That is, in Embodiment 2, the magnetic axis is more inclined than that of Embodiment 1. This causes a region 22*a* and a region 22*b* not to overlap each other (see FIG. 10). Therefore, in the electronic dictionary 1 of Embodiment 2, no dual state detection region is generated. The region 22*a* serves as the closed state detection region and the region 22*b* serves as the tablet state detection region.

In a case where no dual state detection region exists, the electronic dictionary 1 only needs to be provided such that (i) one of magnetic sensors A and B is provided in the closed state detection region and (ii) the other of the magnetic sensors A and B is provided in the tablet state detection region. This allows a relationship between responses of the respective magnetic sensors and states of the electronic dictionary 1 to be similar to those illustrated in FIG. 7 of Embodiment 1. Therefore, the electronic dictionary 1 can determine whether it is in a closed state, in an open state, or in a tablet state.

Embodiment 3

An electronic dictionary of Embodiment 3 of the present invention can be provided to include two magnets, two magnetic sensors, and a single magnetic shield so as to determine, in accordance with responses of the respective two magnetic sensors, whether it is in a closed state, in an open state, or in a tablet state. The following description will discuss an electronic dictionary 2 of Embodiment 3 with reference to FIG. 11.

Figure 11:
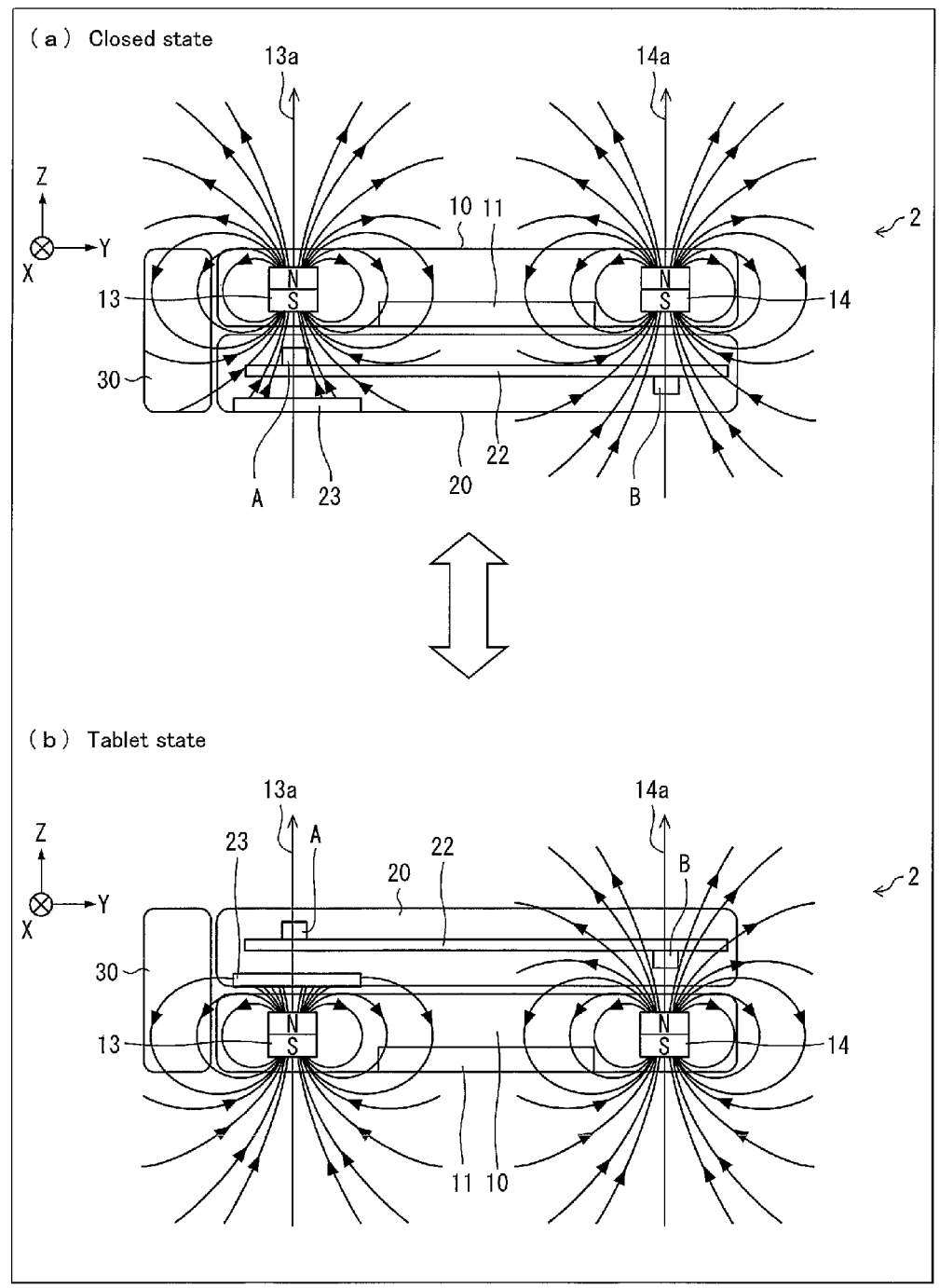
FIG. 11 is a pair of cross-sectional views, as taken along the Y-Z plane, each illustrating an example of how magnets, magnetic sensors, and a magnetic shield are provided in an electronic dictionary of Embodiment 3 of the present invention, (a) of FIG. 11 illustrating the electronic dictionary being in a closed state, and (b) of FIG. 11 illustrating the electronic dictionary being in a tablet state.

FIG. 11 is a cross-sectional view of the electronic dictionary 2 as taken along a Y-Z plane, and illustrates positional relationships between (i) magnetic fields generated by magnets 13 and 14, (ii) magnetic sensors A and B, and (iii) the magnetic shield. (a) of FIG. 11 illustrates a case where the electronic dictionary 2 is in the closed state. (b) of FIG. 11 illustrates a case where the electronic dictionary 2 is in the tablet state.

The electronic dictionary 2 of Embodiment 3 differs from the electronic dictionary 1 of Embodiment 1 in that it includes two magnets and a magnetic shield, which is provided on a magnetic axis of one of the two magnets.

As illustrated in FIG. 11, the electronic dictionary 2 includes the magnets 13 and 14 each provided on an upper casing 10. Each of the magnets 13 and 14 generates magnetic fields around a corresponding one of the magnets 13 and 14 as with the magnet 12 of Embodiment 1.

The magnetic sensor A detects, in the closed state, magnetic fields generated by the magnet 13. The magnetic sensor B detects, in the closed state, magnetic fields generated by the magnet 14.

According to the electronic dictionary 2, a magnetic shield 23 is further provided in a lower casing 20. The magnetic shield 23 shields magnetic fields generated by the magnet 13. As illustrated in FIG. 11, the magnetic shield 23 is provided directly below the magnetic sensor A (on a minus direction side of a Z axis and in a region where the magnetic shield 23 and the magnetic sensor A overlap each other in an X-Y plane) in the lower casing 20 so as to be parallel to a substrate 22. That is, the magnet 13, the magnetic sensor A, and the magnetic shield 23 are provided so as to be collinear (on a magnetic axis 13a) in a Z axis direction while the electronic dictionary 2 is in a closed state or in a tablet state.

That is, according to Embodiment 3, the magnetic sensor A is provided in the lower casing 20 so as to detect, in a closed state or in a tablet state, magnetic fields generated by the magnet 13 provided on the upper casing 10. The magnetic sensor B is provided in the lower casing 20 so as to detect, in the closed state or in the tablet state, magnetic fields generated by the magnet 14 provided on the upper casing 10. The magnetic shield 23 is provided between the magnet 13 and the magnetic sensor A.

Note that, instead of or in addition to the magnetic shield 23, a further magnetic shield can be provided between the magnet 14 and the magnetic sensor B. In Embodiment 3, the magnetic shield is provided in the lower casing 20. However, Embodiment 3 is not limited as such. The magnetic shield can be alternatively provided in the upper casing 10.

The following description will discuss (i) how the magnetic sensors A and B respond while the electronic dictionary 2 is in a closed state and (ii) how the magnetic sensors A and B respond while the electronic dictionary 2 is in a tablet state.

In a case where the electronic dictionary 2 is in a closed state, each of the magnetic sensors A and B detects magnetic fields and supplies an ON signal (see (a) of FIG. 11).

In a case where the electronic dictionary 2 is in a tablet state, the magnet 13 is located on the downside of the magnetic shield 23 (on a minus side of a Z axis) (see (b) of FIG. 11). This causes magnetic fields generated by the magnet 13 to be shielded by the magnetic shield 23, and ultimately causes no magnetic field of the magnet 13 to exist on the magnetic sensor A. Magnetic fields generated by the magnet 14 exist on the magnetic sensor B as with the case shown in (a) of FIG. 11. Consequently, in a case where the electronic dictionary 1 is in a tablet state, only the magnetic sensor B detects magnetic fields and outputs an ON signal.

Note that in a case where the electronic dictionary 2 is in an open state, the upper casing 10 is away from the lower casing 20 as with Embodiment 1. Consequently, none of the magnetic sensors A and B detects magnetic fields, and therefore outputs an ON signal.

This makes it is possible to determine, based on the signals supplied from the magnetic sensors A and B, whether the electronic dictionary 2 is in a closed state, in an open state, or in a tablet state. Specifically, upon receipt of ON signals from the magnetic sensors A and B, a state determination section 120 determines that the electronic dictionary 2 is in a closed state. Upon receipt of an ON signal only from the magnetic sensor B, the state determination section 120 determines that the electronic dictionary 2 is in a tablet state. Upon receipt of no ON signal from the magnetic sensors A and B, the state determination section 120 determines that the electronic dictionary 2 is in an open state.

Note that, in a case where the magnetic sensors A and B are (i) provided in the lower casing 20 and (ii) not affected by the magnetic shield 23, the magnetic sensors A and B can be provided in/on a member other than the substrate 22, provided that the magnetic sensors A and B are provided in a region where the magnetic fields, generated by the magnets 13 and 14, can be detected.

Embodiment 4

An electronic dictionary of the present invention can determine, in accordance with its state, a direction (display direction) in which a display section displays an image. There has been conventionally developed an electronic device that determines, with use of a biaxial sensor or the like, a rotational movement of a casing (Patent Literature 2). Since the present invention can detect an open state, a closed state, and a tablet state of the electronic dictionary, as has been described in Embodiments 1 through 3, it has an advantage of determining a display direction in accordance with the state it has been detected. The following description will discuss, with reference to FIGS. 13 and 14, an electronic dictionary 3 of Embodiment 4 of the present invention.

Figure 13:
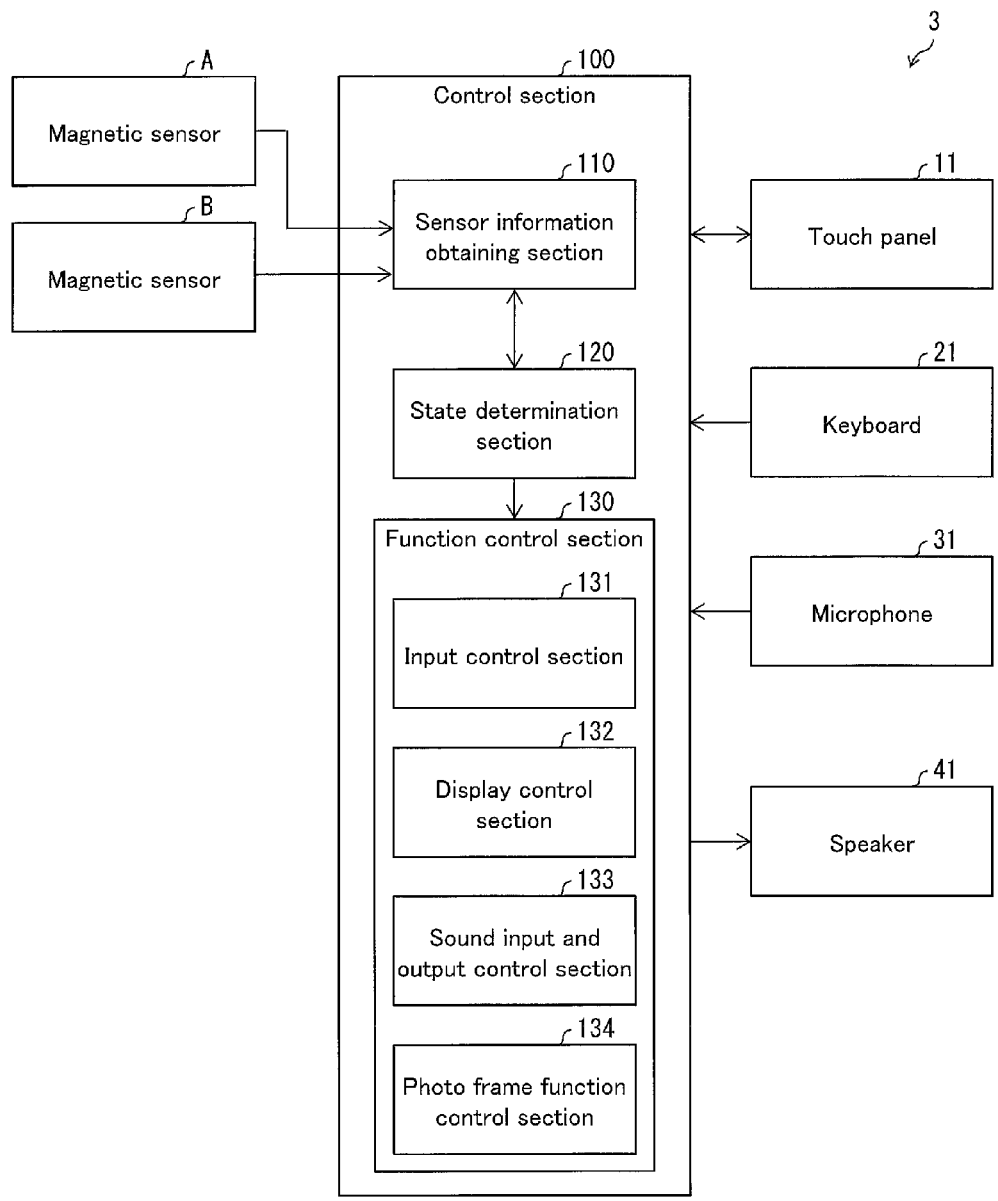
FIG. 13 illustrates a main part of an electronic dictionary of Embodiments 4 through 6 of the present invention.

FIG. 13 illustrates a main part of the electronic dictionary 3 of Embodiment 4 of the present invention. Note that FIG. 13 illustrates, in addition to members illustrated in the block diagram of FIG. 8, members to be described in Embodiments 4 through 6. Note that, as to the members that are newly illustrated in FIG. 13, only necessary configuration will be described in each of Embodiments.

A function control section 130 of the electronic dictionary 3 can include a display control section 132. The display control section 132 controls a display section of a touch panel 11 to display an image in a display direction that varies depending on a state of the electronic dictionary 3, which state is determined by a state determination section 120. The display control section 132 controls the display section to display an image in different display directions at least for an open state and a tablet state of the electronic dictionary 3. Embodiment 3 illustrates an example case where the display control section 132 controls the display section to (i) display an image in a horizontal direction (X axis direction in FIG. 14) while the electronic dictionary 3 is in an open state and (ii) display an image in a vertical direction (Y axis direction in FIG. 14) while the electronic dictionary 3 is in a tablet state. The display control section 132 needs to at least determine whether the display section displays an image in the vertical direction or in the horizontal direction. More preferably, the display control section 132 can also determine a display direction in an up and down direction of an image.

Figure 14:
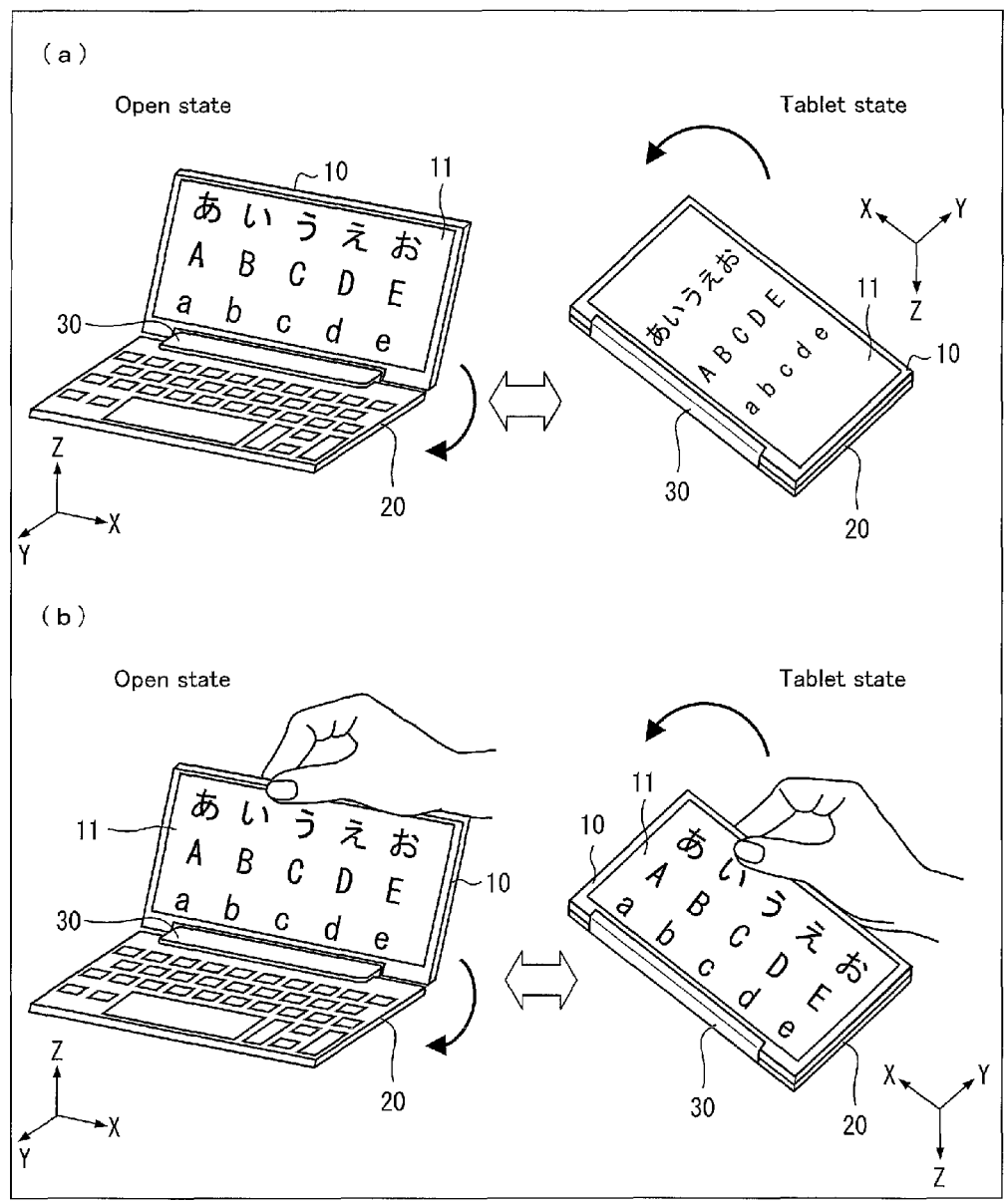
FIG. 14 is a pair of views each illustrating how the electronic dictionary of Embodiment 4 controls a display direction of an image, (a) of FIG. 14 illustrating a display direction in which the electronic dictionary displays an image in an open state or in a tablet state, and (b) of FIG. 14 illustrating the display direction of the image displayed in a case where a state of the electronic dictionary is changed while a touch panel is being touched.

(a) of FIG. 14 illustrates (i) a display direction in which an image is displayed while the electronic dictionary 3 is in an open state and (ii) a display direction in which the image is displayed while the electronic dictionary 3 is in a tablet state. As illustrated in (a) of FIG. 14, while the electronic dictionary 3 is in the open state, the display section displays the image in the horizontal direction. In a case where a user rotates an upper casing 10 or a lower casing 20 around a hinge 30 to change the electronic dictionary 3 from the open state to the tablet state, the state determination section 120 determines, based on information obtained from a sensor information obtaining section 110, that the electronic dictionary 3 is in a tablet state. The display control section 132 then determines, in accordance with a determination, that the display section displays the image in the vertical direction.

Note that, even in a case where the electronic dictionary 3 is changed from a tablet state to an open state, each member of the electronic dictionary 3 carries out processes similar to those as described above. That is, in such a case, the display control section 132 determines that a display direction, in which an image is displayed, is a display direction corresponding to an open state, i.e., the horizontal direction. Note also that in a case where the state determination section 120 determines that the electronic dictionary 3 is in a closed state, the display control section 132 can (i) control the display section not to display an image or (ii) power off the electronic dictionary 3 as described in Embodiment 1.

Alternatively, a user can freely set whether or not the display control section 132 changes a display direction of the image in accordance with a state of the electronic dictionary 3 (i.e., whether or not the display control section 132 links a state of the electronic dictionary 3 with a display direction of the image). For example, a storage section (not illustrated) can store a setting of whether or not to link the state of the electronic dictionary 3 with the display direction of the image. In doing so, the display control section 132 preferably refers, before controlling the display section of the touch panel 11 to display the image, to the setting stored in the storage section and change a display direction of the image in accordance with a state of the electronic dictionary 3.

In a case where a user carries out a given operation to switch the display direction (for example, between the vertical direction and the horizontal direction) after the display control section 132 has determined the display direction, the display control section 132 can change, in accordance with the given operation, the display direction of the image displayed on the display section.

Alternatively, the display control section 132 can switch the display direction of the image after a given period of time has elapsed since the state of the electronic dictionary 3 was changed (i.e., after a the given period of time has elapsed since the display control section 132 received, from the state determination section 120, a determination of the state of the electronic dictionary 3). It is desirable that the given period of time be set to a period of time which is predicted to be long enough for the state of the electronic dictionary 3 to be fixed (for the user to determine in which state he/she is to use the electronic dictionary 3). The given period of time can be measured based on, for example, a clock of the control section 100. Alternatively, in a case where the electronic dictionary 3 has a clock function, the given period of time can be measured based on time measured by the clock function. In a case where the state of the electronic dictionary 3 is changed while the given period of time is being measured (i.e., in a case where the state determination section 120 makes a determination different from a determination made when the measurement was started), the display control section 132 can reset the given period of time.

Note that securing the given period of time between (i) the time when the state of the electronic dictionary 3 has been changed and (ii) the time when the display direction of the image has been changed means that the user has decided to use the electronic dictionary 3 in a state where the direction of the image has been changed. The above configuration allows for preventing the display direction of the image from changing one after the other, even in a case where the state of the electronic dictionary 3 is changed in a moment by reason that the user accidentally rotates the upper casing 10 or the lower casing 20 of the electronic dictionary 3 (i.e., at a stage when the user has not yet decided in which state he/she is to use the electronic dictionary 3).

Note also that the display control section 132 does not need to change the display direction of an image, in a case where the electronic dictionary 3 is changed between a tablet state and an open state when a user carries out a given operation or while the user is carrying out the given operation. Namely, the display control section 132 can keep the display direction of the image which display direction is the one that the electronic dictionary 3 had before the display direction was changed. Note that the "given operation" can be any operation, provided that the electronic dictionary 3 can detect it. Embodiment 4 will illustrate a case where the given operation is an operation of touching on the touch panel 11. Note, however, that the given operation can be, for example, (i) an operation carried out with respect to the keyboard 21 by pushing a given key, or (ii) an entering operation via the another input device in a case where the another input device is connected to the electronic dictionary 3.

(b) of FIG. 14 illustrates a display direction in which an image is displayed in a case where the electronic dictionary 3 changes its state while the touch panel 11 is being touched. In a case where the electronic dictionary 3 is changed from an open state to a tablet state (or from a tablet state to an open state) while the touch panel 11 is being touched (see (b) of FIG. 14), the touch panel 11 detects the touch and supplies, to a control section 100 (operation detection section), a signal indicative of the touch. Upon receipt of the signal, the control section 100 controls the display control section 132 of the function control section 130 to keep (not to change) the display direction of the image displayed on the display section unchanged. Therefore, even in a case where the electronic dictionary 3 is changed to a tablet state during the touch operation, the display direction (horizontal direction), i.e., the display direction in the open state, is kept unchanged.

Note that the control section 100 can also carry out the above process in a case where (i) a touch on the touch panel 11 is detected and (ii) the state of the electronic dictionary 3 is changed within a certain period of time after the touch was detected. In a case where the user stops carrying out a given operation after changing the state of the electronic dictionary 3, the display control section 132 can (i) change the display direction of the image in accordance with a state to which the electronic dictionary 3 has been changed or (ii) keep the display direction that the image had before the state was changed. For example, in a case where the user (a) changes the electronic dictionary 3 from an open state to a tablet state while touching the touch panel 11 as shown in (b) of FIG. 14 and (b) then moves his/her finger off the touch panel 11, the display control section 132 can (i) change a display direction of the image to the vertical direction in accordance with the tablet state or (ii) keep the display direction that the image had before the state was changed (open state).

As described above, the user will not ordinarily carry out the "given operation (touch on the touch panel 11)" which is carried out so that the display direction of the image on the display section is kept, in a case where the user changes the state of the electronic dictionary 3 by rotating the upper casing 10 or the lower casing 20. In other words, the given operation is intentionally carried out by the user such that the state of the electronic dictionary 3 is changed while keeping the display direction of the display section unchanged. With the above configuration, the electronic dictionary 3 can display an image in a display direction desired by the user, by detecting such a user's intentional operation (an instruction for changing the state of the electronic dictionary 3 without changing the display direction).

Embodiment 5

An electronic dictionary 3 of Embodiment 5 of the present invention can further include at least one of a microphone and a speaker so as to change, between a tablet state and an open state of the electronic dictionary 3, at least one of an input level of the microphone and an output level of the speaker.

Note, hereunder, that (i) the input level means a sound detection sensitivity (gain) of the microphone, an amplification coefficient of a detected sound (volume), or a combination thereof. The output level means a strength of a signal inputted via the speaker, a volume of the speaker, or a combination thereof.

The electronic dictionary 3 of Embodiment 5 includes at least one of a microphone 31 (sound input section) and a speaker 41 (sound output section), and a sound input and output control section 133 (see FIG. 13). The microphone 31 is a sound input section for inputting a sound into the electronic dictionary 3. The speaker 41 is a sound output section for outputting a sound from the electronic dictionary 3. The sound input and output control section 133 changes at least one of the input level of the microphone 31 and the output level of the speaker 41 in accordance with a state of the electronic dictionary 3, which state is determined by a state determination section 120.

Figure 15:
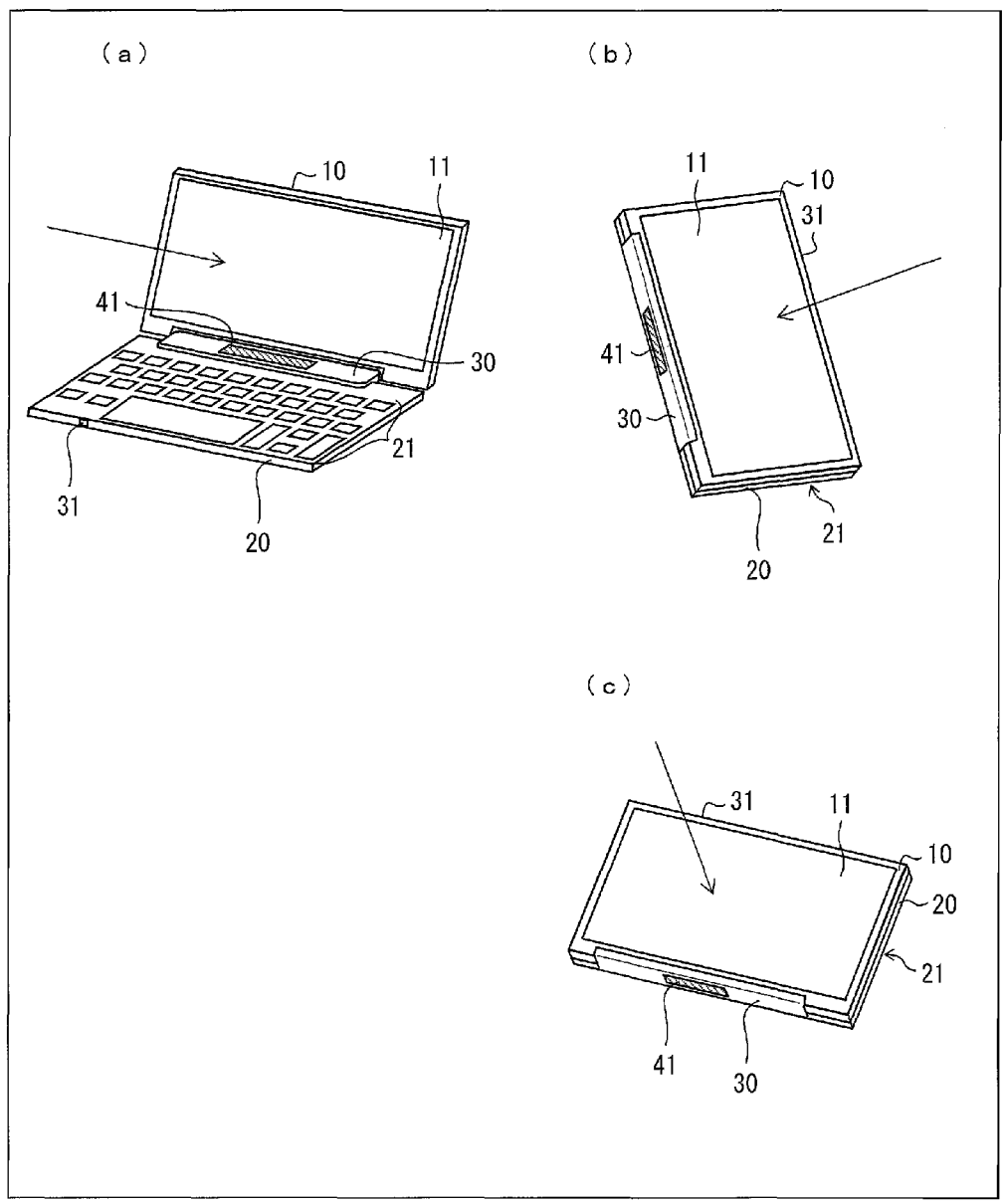
FIG. 15 is a set of views each illustrating how a microphone and a speaker are located in the electronic dictionary of Embodiment 5, (a) of FIG. 15 illustrating how the microphone and the speaker are located in a case where the electronic dictionary is in the open state, and (b) and (c) of FIG. 15 each illustrating how the microphone and the speaker are located in a case where the electronic dictionary is in a tablet state.

(a) of FIG. 15 illustrates how the microphone 31 and the speaker 41 are located in a case where the electronic dictionary 3 is in an open state. (b) and (c) of FIG. 15 each illustrate how the microphone 31 and the speaker 41 are located in a case where the electronic dictionary 3 is in a tablet state. Arrows indicated in (a) through (c) of FIG. 15 each indicate a direction from which a user views the electronic dictionary 3.

According to an example illustrated in FIG. 15, the microphone 31 is provided on a side surface of a lower casing 30 of the electronic dictionary 3, and the speaker 41 is provided at a center of a hinge 30. That is, in a case where the electronic dictionary 3 is in an open state, the microphone 31 and the speaker 41 are located in a direction in which a face of the user is present (direction of eyes of the user) (see (a) of FIG. 15). In contrast, in a case where the electronic dictionary 3 is in a tablet state, the microphone 31 and the speaker 41 are located in a direction different from the direction in which the face of the user is present, regardless of whether the user holds the electronic dictionary 3 in a vertical direction (see (b) of FIG. 15) or a horizontal direction (see (c) of FIG. 15).

In a case where the microphone 31 and the speaker are thus located in a direction different from the direction in which the face of the user is present, a sound outputted from the speaker 41 can be heard small by the user and/or a voice of the user can be recorded via the microphone 31 at a small recording level. This kind of problem in the case of the example shown in FIG. 15 can be addressed by taking the following measures. Specifically, in a case where the electronic dictionary 3 is in the tablet state, the sound input and output control section 133 amplifies the input level of the microphone 31 and the output level of the speaker 41 so that they become greater than those of the electronic dictionary 3 which is in the open state.

Embodiment 6

An electronic dictionary 3 of Embodiment 6 of the present invention can monitor whether it carries out a given function. The "given function" is not particularly limited. Examples, described in Embodiment 6, of the given function encompass (i) a function of causing the electronic dictionary 3 to serve as a photo frame by causing a touch panel 11 to display photographs in the form of slide show (photo frame function) and (ii) a function of playing back moving images. Note that the given function is desirably a function (for example, a touch on the touch panel 11) that does not need any entering operation with the use of a keyboard 21 or that is operable by an operation other than the operation with the use of the keyboard 21.

Figure 16:
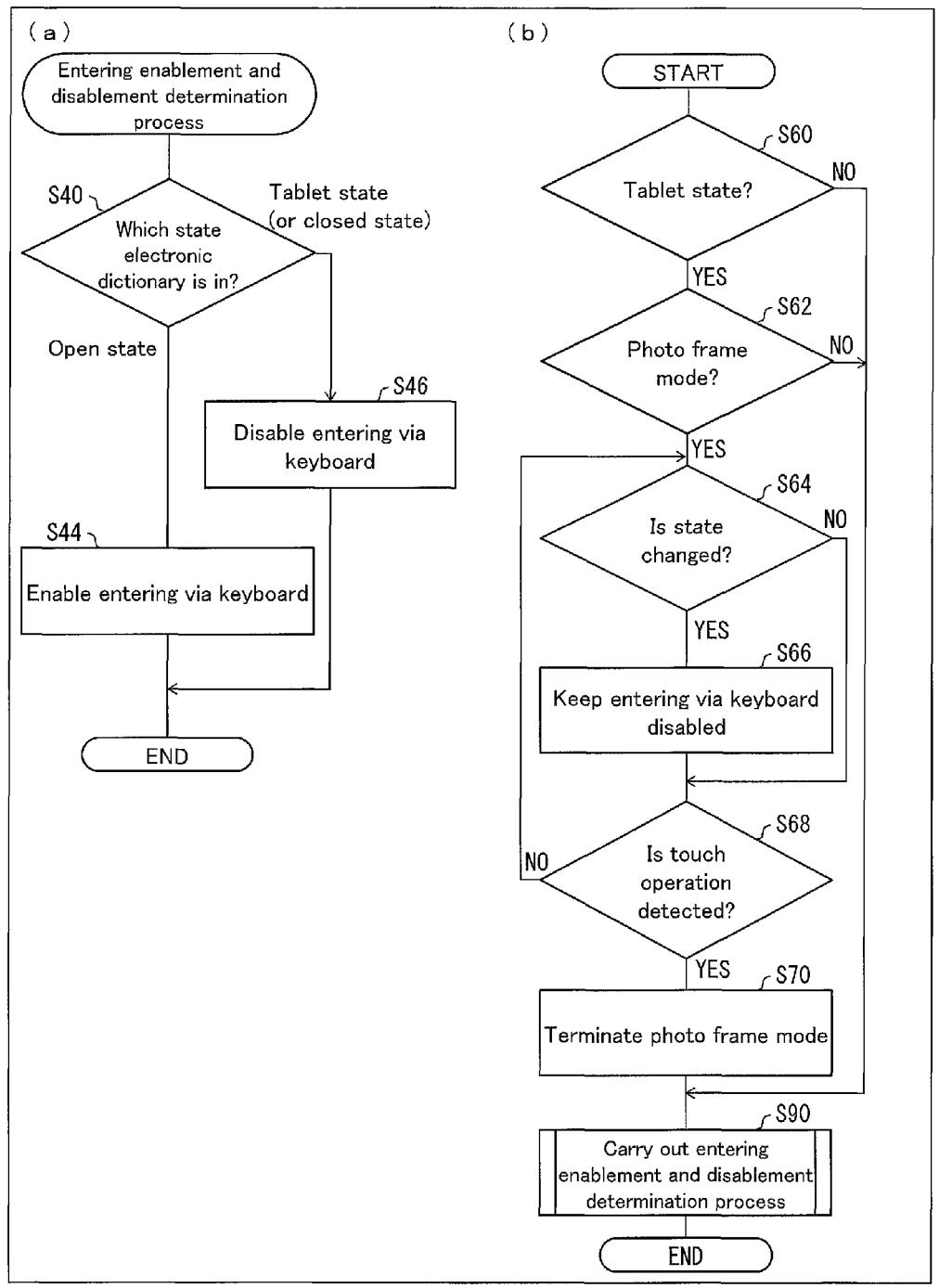
FIG. 16 is a set of flowcharts each illustrating a process that an input control section of the electronic dictionary of Embodiment 6 carries out, (a) of FIG. 16 being a flowchart illustrating a process for enabling or disabling the keyboard by the input control section, and (b) of FIG. 16 being a flowchart illustrating a variation of the process for enabling or disabling the keyboard by the input control section.

The following description will discuss, with reference to FIGS. 13 and 16, an input control of the keyboard 21, which input control is carried out in accordance with whether or not a given function is being carried out in the electronic dictionary 3. Note, hereafter, that the following description will discuss a case where the given function is the "photo frame function." Hereinafter, a state where the electronic dictionary 3 is carrying out the photo frame function will be referred to as a "photo frame mode."

The following description will discuss, with reference to FIG. 13, a configuration of the electronic dictionary 3 of Embodiment 6. The electronic dictionary 3 of Embodiment 6 differs from Embodiments 1 through 5, in that it further includes a photo frame function control section 134 and an input control section 131.

The photo frame function control section 134 determines whether or not the electronic dictionary 3 carries out the photo frame function (i.e., whether or not the electronic dictionary 3 is in the photo frame mode). After the electronic dictionary 3 starts up a program for executing the photo frame function, the photo frame function control section 134 notifies the input control section 131 of the electronic dictionary 3 being changed to the photo frame mode. Note that the photo frame function can be terminated or suspended by, for example, a given operation by a user. The control section 100 can terminate the photo frame function, for example, in a case where the user touches the touch panel 11.

An input control section 131 (first input disabling section) enables or disables, in accordance with a determination made by a state determination section 120, an operation via the keyboard 21. (a) of FIG. 16 is a flowchart illustrating a process for enabling or disabling the keyboard 21 by the input control section 131. The state determination section 120 informs the input control section 131 of whether the electronic dictionary 3 is in a closed state, in an open state, or in a tablet state. In a case where the electronic dictionary 3 is in a tablet state or in a closed state ("tablet state (or closed state) in S40), the input control section 131 disables entering via the keyboard 21 (S46). In a case where the electronic dictionary 3 is in an open state ("open state" in S40), the input control section 131 enables entering via the keyboard 21 (S44).

Note that even in a case where the electronic dictionary 3 is changed from a tablet state to another state, the input control state 131 can exceptionally keep entering via the keyboard 21 disabled, provided that the electronic dictionary 3 is in a photo frame mode.

(b) of FIG. 16 is a flowchart illustrating a variation of the process for enabling or disabling the keyboard 21 by the input control section 131. According to the variation, in a case where the input control section 131 is notified of a state of the electronic dictionary 3 by the state determination section 120, it determines whether or not the electronic dictionary 3 is in a tablet state (S60). In a case where the electronic dictionary 3 is in the tablet state (YES in S60), the input control section 131 then refers to a determination made by the photo frame function control section 134 so as to check whether or not the electronic dictionary 3 is in a photo frame mode (S62). In a case where (i) the electronic dictionary 3 is not in the tablet state (NO in S60) or (ii) the electronic dictionary 3 is not in the photo frame mode (NO in S62), the input control section 131 carries out the process for enabling or disabling the keyboard 21 (S90) (see (a) of FIG. 16).

In a case where the electronic dictionary 3 is in the photo frame mode (YES in S62), the electronic dictionary 3 is in a tablet state and is executing the photo frame function. In a case where (i) the state of the electronic dictionary 3 is changed at this moment by, for example, an operation carried out by the user and (ii) the state determination section 120 detects the change in state (YES in S64), the input control section 131 keeps entering via the keyboard 21 disabled (S66), without carrying out the process for enabling or disabling the entering via the keyboard 21 (illustrated in (a) of FIG. 16). Note that in a case where no change in state of the electronic dictionary 3 is made during the photo frame mode (NO in S64), the input control section 131 will not carry out any process.

In a case where the electronic dictionary 3 is changed into the photo frame mode during the tablet state, the input control section 131 keeps the entering via the keyboard 21 disabled. In a case where the control section 100 detects a touch operation carried out via the touch panel 11 (YES in S68), it terminates the photo frame function (i.e., releases the photo frame mode) (S70). Note that while the control section 100 is not detecting a touch operation via the touch panel 11 (NO in S68), it controls the electronic dictionary 3 to keep carrying out the photo frame function. In a case where the photo frame mode is released, the input control section 131 carries out the process for enabling or disabling the entering via the keyboard 21 (S90).

In general, while the electronic dictionary 3 is carrying out functions (such as browsing of an image or a moving image) that do not request the user to carry out many operations as with carrying out the photo frame function, the user is less likely to carry out an entering operation via the keyboard 21. Furthermore, in a case where the electronic dictionary 3 is carrying out, while the keyboard 21 is being disabled as with the tablet state, such functions that do not request the user to carry out many operations, the user is least likely to carry out an entering operation via the keyboard 21.

As described above, while a specific function is being carried out in the tablet state, the operation via the keyboard 21 is kept disabled. This can prevent misrecognition of entering via the keyboard 21 that may be caused by the user in a case where he/she accidentally moves the electronic dictionary 3. This allows an improvement in the user's convenience.

Embodiment 7

There has been recently developed an electronic device having an upper casing that can be folded towards a back side of a lower casing. Some of such conventional foldable electronic devices are designed such that an upper casing is rotatable by about 360 degrees with respect to a lower casing In the case of such an electronic device having the upper casing that is rotatable by about 360 degrees with respect to the lower casing, a user can use the electronic device while an upper casing 210 is being open at various angles. For example, the user can use an electronic device 200 even in a case where the upper casing 210 is further rotated from the state shown in (b) of FIG. 12 and the electronic device 200 is reversed upside down. In such a case, it is an upper surface (on a plus direction side of a Z axis) of a lower casing 220 that supports the electronic device 200.

The conventional electronic device 200 can detect that the conventional electronic device 200 (upper casing 210) is open, but cannot determine how a surface of the upper casing 210 and a surface of the lower casing 220 are located. Specifically, the conventional electronic device 200 cannot determine (i) at what angle the upper casing 210 is with the lower casing 220 and (ii) which surface of the lower casing 200 is supporting the electronic device 200 (i.e., which surface of the lower casing 200 is in contact with a floor, a stand, or the like).

An electronic dictionary of Embodiment 7 is attained in view of the above problem, and can determine how a surface of an upper casing and a surface of a lower casing are located.

The electronic dictionary 3 of Embodiment 7 can be configured to determine whether or not it is in a photo frame state.

The "photo frame state" as used herein means a state where an angle at which (i) a surface of an upper casing 10 on which surface a touch panel 11 is provided is with (ii) a surface of a lower casing 20 on which surface a keyboard 21 is provided is greater than 180 degrees and not greater than 360 degrees. Note that the above angle is defined to become 0 degree when the upper casing 10 is folded on the plus direction side of the Z axis of the lower casing 20 so that the upper casing 10 and the lower casing 20 overlap each other (i.e., when the touch panel 11 and the keyboard 21 face substantially parallel to each other as shown in FIG. 2 and (a) of FIG. 18, which will be later described). Hereinafter, the angle will be merely referred to as an "angle of the upper casing 10 to the lower casing 20".

Figure 17:
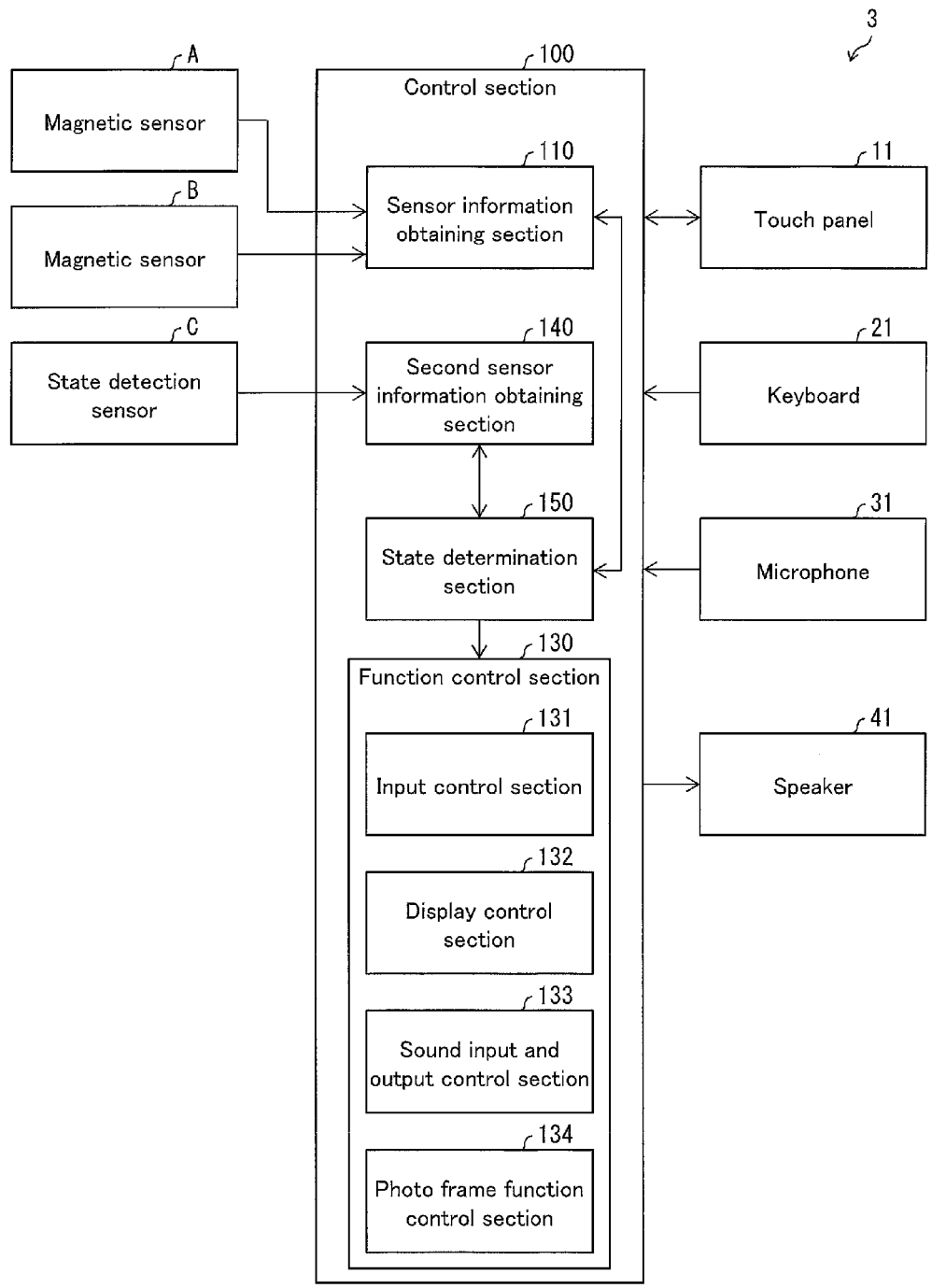
FIG. 17 illustrates a main part of an electronic dictionary of Embodiment 7 of the present invention.

The following description will discuss, with reference to FIGS. 17 through 20, the electronic dictionary 3 of Embodiment 7 of the present invention. A configuration of the electronic dictionary 3 will be first described below with reference to FIG. 17. FIG. 17 illustrates a main part of the electronic dictionary 3 of Embodiment 7. As is clear from FIG. 17, the electronic dictionary 3 of Embodiment 7 includes at least a state detection sensor C (fourth state detection section), a second sensor information obtaining section 140, a state determination section 150, and an input control section 131 (second input disabling section).

The state detection sensor C detects signals that differ (are distinctive) depending on whether the electronic dictionary 3 is in a photo frame state or in other types of states. Note that the state detection sensor C will be specifically later described. The state detection sensor C supplies the signal thus detected to the second sensor information obtaining section 140 of a control section 100. The second sensor information obtaining section 140 obtains the signal supplied from the state detection sensor C, and then supplies the signal to the state determination section 150.

The state determination section 150 receives the output signal of the state detection sensor C obtained by the second sensor information obtaining section 140, and then determines, based on the signal, whether or not the electronic dictionary 3 is in a photo frame state. A process, in which the state determination section 150 determines the photo frame state, will be specifically later described. A determination made by the state determination section 150 is supplied to a function control section 130.

The function control section 130 of Embodiment 7 includes at least the input control section 131. The input control section 131 (input disabling section) determines, in accordance with the determination made by the state determination section 150, whether to enable or disable an operation via the keyboard 21. In a case where the state determination section 150 determines that the electronic dictionary 3 is in a photo frame state, the input control section 131 disables the operation via the keyboard 21. In a case where the state determination section 150 determines that the electronic dictionary 3 is not in a photo frame state, the input control section 131 enables the operation via the keyboard 21.

As shown in FIG. 17, the electronic dictionary 3 of Embodiment 7 can further include a display control section 132, a sound input and output control section 133, a photo frame function control section 134, a microphone 31, and a speaker 41. In such a case, the sections only need to have respective functions similar to those described in Embodiments 1 through 6.

The electronic dictionary of Embodiment 7 is desirably configured to distinguish the photo frame state and to distinguish between three states, i.e., a closed state, an open state, and a tablet state as has been described in Embodiments 1 through 6. The following description will discuss, with reference to FIGS. 17 and 18, a configuration and a process of the electronic dictionary 3 of Embodiment 7 that distinguishes between four states, i.e., the closed state, the open state, the tablet state, and a photo frame state.

The electronic dictionary 3 of Embodiment 7, which distinguishes between the closed state, the open state, the tablet state, and the photo frame state, includes magnetic sensors A and B and a sensor information obtaining section 110 (see FIG. 17). The members only need to have respective functions similar to those described in Embodiments 1 through 6.

In such a case where the electronic dictionary 3 includes the magnetic sensors A and B and the sensor information obtaining section 110, the state determination section 150 only need to determine whether the electronic dictionary 3 is in the closed state, the open state, the photo frame state, or the tablet state, based on (i) the output signal of the state detection sensor C and (ii) the output signals of the respective magnetic sensors A and B obtained by the sensor information obtaining section 110.

In a case where the state determination section 150 determines that the electronic dictionary 3 is in a tablet state, the input control section 131 can disable an operation via the keyboard 21. In a case where the state determination section 150 determines that the electronic dictionary 3 is in a closed state, the input control section 131 can disable the operation via the keyboard 21 or power off the electronic dictionary 3.

Figure 18:
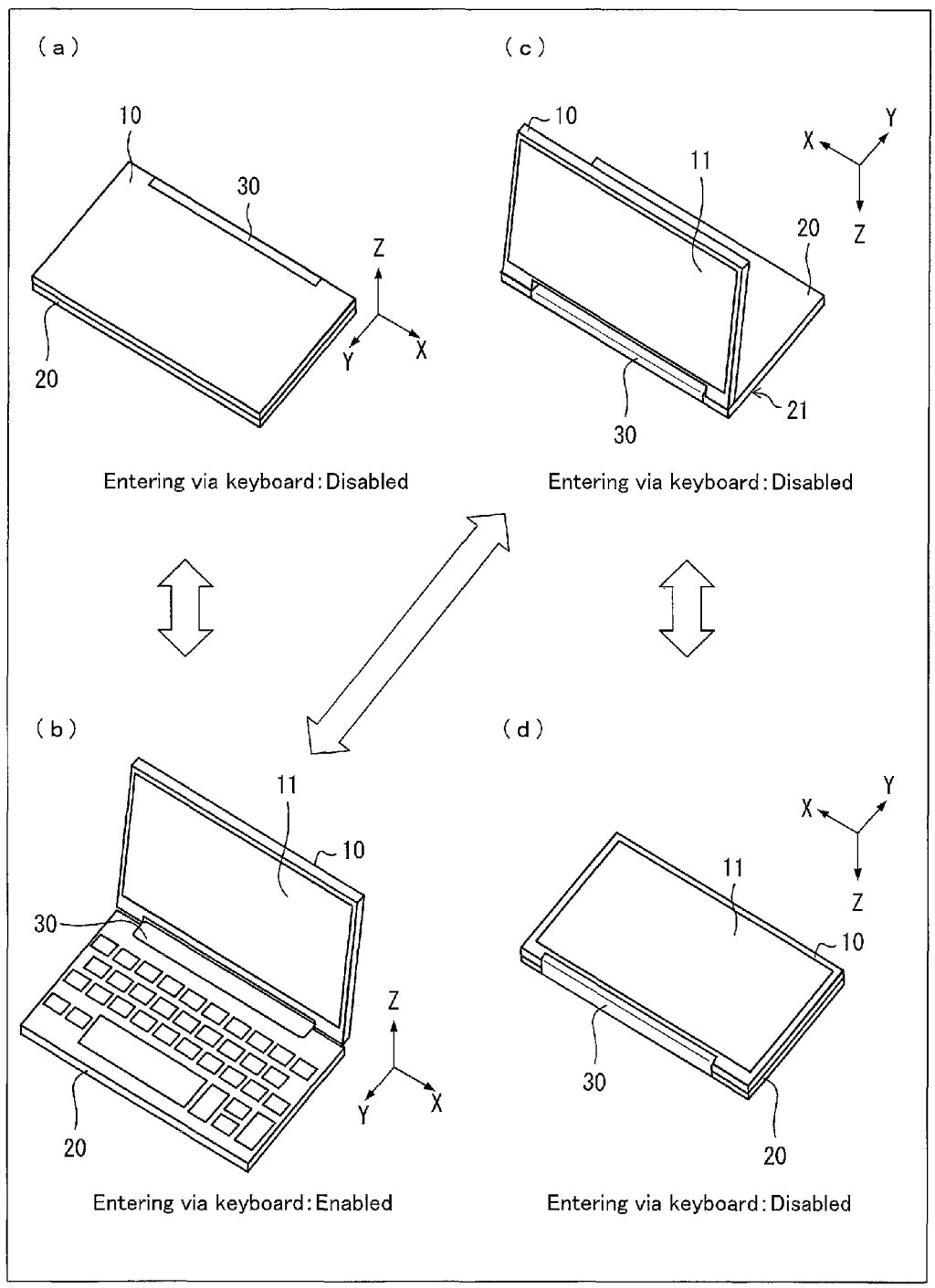
FIG. 18 illustrates each of four states (closed state, open state, tablet state, and photo frame state) of the electronic dictionary of Embodiment 7 and illustrates enablement and disablement settings of an operation via the keyboard in each of the four states.

FIG. 18 illustrates the four states (closed state, open state, tablet state, and photo frame state) of the electronic dictionary 3 in accordance with Embodiment 7 and enablement and disablement settings of an operation via the keyboard 21 in each of the four states.

By rotating the upper casing 10 (or the lower casing 20) around a hinge 30, the electronic dictionary 3 is changed from the closed state ((a) of FIG. 18) to the open state ((b) of FIG. 18), the photo frame state ((c) of FIG. 18), and the tablet state ((d) of FIG. 18) in this order. In a case where the electronic dictionary 3 is configured to distinguish between the four states, the "photo frame state" is one state of the open state, and the tablet state is a state where the angle of the upper casing 10 to the lower casing 20 is 360 degrees. In such a case, the photo frame state is one state of the open state and is a state where the angle of the upper casing 10 to the lower casing 20 is greater than 180 degrees and smaller than 360 degrees.

In a case where the electronic dictionary 3 is in a photo frame state or in a tablet state, a surface on which the keyboard 21 is provided is outside of the electronic dictionary 3 (see (c) and (d) of FIG. 18). Consequently, in a case where the electronic dictionary 3 is in a photo frame state or in a tablet state and the user holds the electronic dictionary 3 with his/her hand, fingers (fingers that support the electronic dictionary 3) of the user are highly likely to touch the keyboard 21. In a case where the electronic dictionary 3 is in a photo frame state or in a tablet state and the electronic dictionary 3 is laid on a table or the like, the keyboard 21 is likely to be brought into contact with the table.

In a case where the electronic dictionary 3 is thus in a photo frame state or in a tablet state, the keyboard 21 may be accidentally touched (erroneous operation). In view of this, the electronic dictionary 3 of Embodiment 7 disables the keyboard 21, in a case where the state determination section 150 determines that the electronic dictionary 3 is in a photo frame state or in a tablet state. This allows the state determination section 150 not to misrecognize such an unintended touch as a true operation via the keyboard.

The state detection sensor C can be, for example, an angle detection sensor that detects an angle of the upper casing 10 to the lower casing 20. The angle detection sensor, configured to be included in, for example, the hinge 30, can detect, based on an angle by which the hinge 30 has been rotated, an angle of the upper casing 10 to the lower casing 20.

The state determination section 150 receives, from the second sensor information obtaining section, an output signal of the angle detection sensor (i.e., information indicative of an angle). In a case where the angle is greater than 180 degrees, the state determination section 150 determines that the electronic dictionary 3 is in a photo frame state. In a case where the angle is not greater than 180 degrees, the state determination section 150 determines that the electronic dictionary 3 is not in a photo frame state.

Note that in a case where the state determination section 150 is configured to distinguish, based on output results of the respective magnetic sensors A and B, between the closed state, the open state, and the tablet state, the state determination section 150 first determines whether the electronic dictionary 3 is in an open state (which includes a photo frame state). In a case where the electronic dictionary 3 is in an open state, the state determination section 150 only need to determine, in accordance with an output result (angle) of the angle detection sensor, whether or not the electronic dictionary 3 is in a photo frame state.

Alternatively, the state determination section 150 can determine, with use of the angle detection sensor, a closed state, an open state, a photo frame state, and a tablet state in the following manner. Specifically, in a case where an angle detected by the angle detection sensor is about 0 degree (an angle of not greater than a predetermined angle (e.g., 5 degrees)), the state determination section 150 determines that the electronic dictionary 3 is in a closed state. In a case where the angle detected by the angle detection sensor is greater than about 0 degree and not greater than 180 degrees, the state determination section 150 determines that the electronic dictionary 3 is in an open state. In a case where the angle detected by the angle detection sensor is greater than 180 degrees and smaller than about 360 degrees (or a predetermined angle (e.g., 360 degrees)), the state determination section 150 determines that the electronic dictionary 3 is in a photo frame state. In a case where the angle detected by the angle detection sensor is about 360 degrees, the state determination section 150 determines that the electronic dictionary 3 is in the tablet state.

Note that a magnetic sensor can be employed as the state detection sensor C. In such a case, the electronic dictionary 3 includes at least (i) one magnetic sensor (hereinafter, referred to as a "magnetic sensor C") serving as the state detection sensor C and (ii) one magnet that generates magnetic fields to be detected by the magnetic sensor C.

The magnetic sensor C is, for example, a hall sensor or a MR sensor that can detect magnetic fields in a given direction. According to Embodiment 7, in a case where the magnetic sensor C detects magnetic fields of not smaller than a given threshold, it supplies, to the second sensor information obtaining section 140, an ON signal indicating that the magnetic field has been detected. One of the magnetic sensor C and the magnet is provided in one of the upper casing 10, the lower casing 20, and the hinge 30, and the other one of the magnetic sensor C and the magnet is provided in another one of the upper casing 10, the lower casing 20, and the hinge 30. Note that which of the upper casing 10, the lower casing 20, and the hinge 30 the magnet is to be provided in is not particularly limited.

Figure 19:
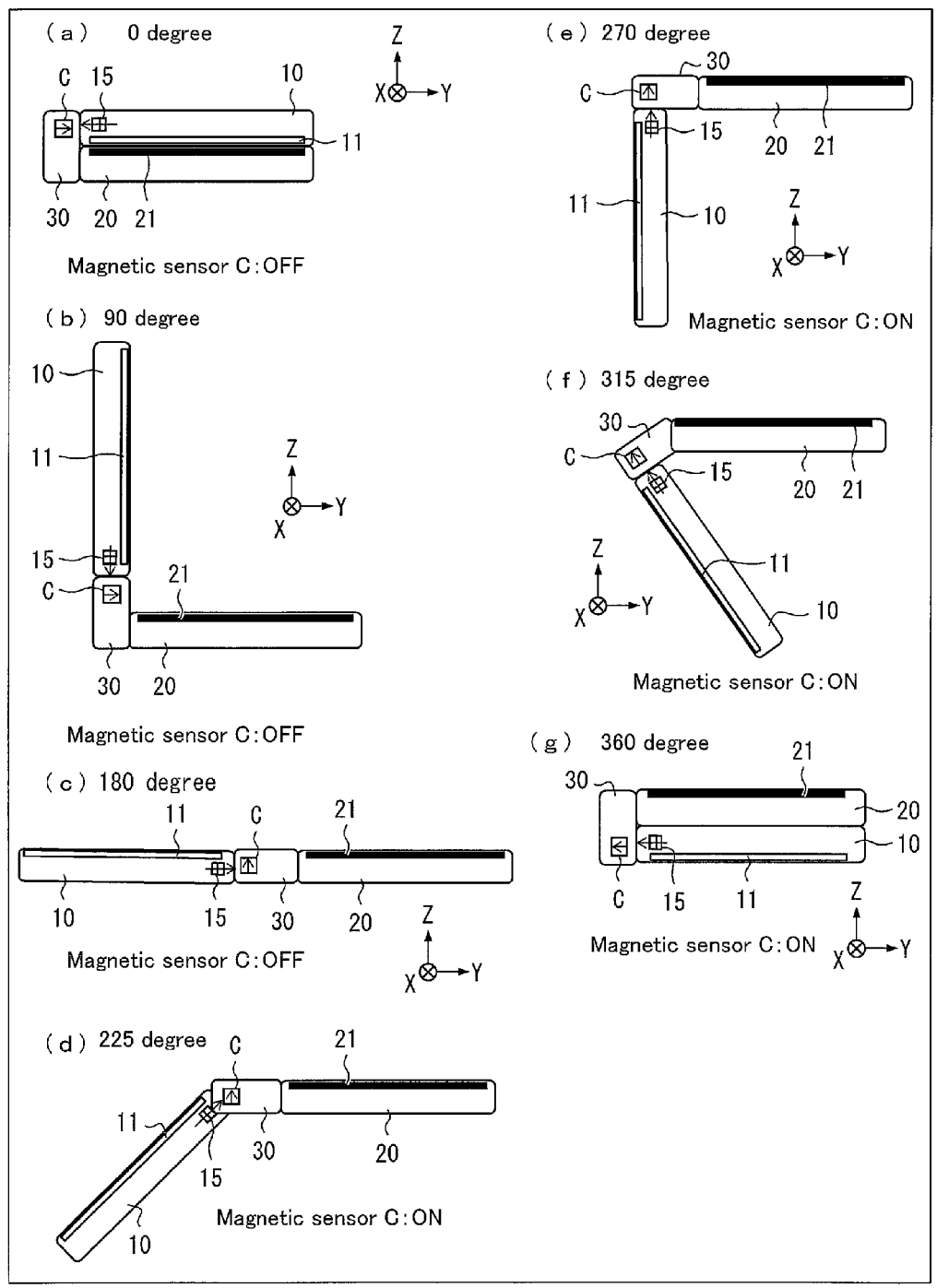
FIG. 19 is a set of views (a) through (g) each being a cross-sectional view of the electronic dictionary of Embodiment 6, as taken along the Y-Z plane, having a magnetic sensor and a magnet and each illustrating an angle of an upper casing to a lower casing, and a detection result of the magnetic sensor (ON and OFF of signal output).

The following description will discuss, with reference to FIG. 19, how a photo frame state is detected with use of the magnetic sensor C and the magnet. Each of (a) through (g) of FIG. 19 is a cross-sectional view of the electronic dictionary 3, as taken along a Y-Z plane, including the magnetic sensor C and a magnet 15. FIG. 19 illustrates (i) an angle of the upper casing 10 to the lower casing 20 and (ii) a detection result (ON or OFF of signal output) of the magnetic sensor C. Note that each arrow on the magnetic sensor C indicates a direction of magnetic fields that the magnetic sensor C can detect. Note also that each arrow passing through the magnet 15 indicates a direction of lines of magnetic force, which are headed from a north pole to a south pole of the magnet 15.

In a case where the angle of the upper casing 10 to the lower casing 20 of the electronic dictionary 3 is about 0 degree to 180 degrees, magnetic fields generated by the magnet 15 do not contain magnetic fields in a direction that the magnetic sensor C can detect (see (a) through (c) of FIG. 19). The magnetic sensor C does not therefore respond and does not output any signal (OFF).

In a case where the angle of the upper casing 10 to the lower casing 20 of the electronic dictionary 3 is greater than 180 degrees and smaller than 270 degrees (i.e., in a case where the upper casing 10 is rotated as illustrated in (c) through (e) of FIG. 19), as the angle of the upper casing 10 to the lower casing 20 becomes greater, magnetic fields generated by the magnet 15 contain a greater amount of magnetic fields in a direction that the magnetic sensor C can detect. In a case where the angle reaches 270 degrees, the magnetic fields generated by the magnet 15 contain the greatest amount of magnetic fields in a direction that the magnetic sensor C can detect. In a case where the angle is not smaller than 270 degrees, the magnetic fields generated by the magnet 15 contain the greatest amount of magnetic fields in a direction that the magnetic sensor C can detect (see (e) through (g) of FIG. 19).

In a case where the angle of the upper casing 10 to the lower casing 20 is greater than 180 degrees and not greater than 360 degrees, the magnetic fields generated by the magnet 15 thus contain magnetic fields in a direction that the magnetic sensor C can detect. Therefore, in such a case, the magnetic sensor C detects the magnetic fields in the given direction, and then supplies an ON signal.

In a case where the magnetic sensor C detects magnetic fields in the given direction, it supplies an ON signal to the second sensor information obtaining section 140. The second sensor information obtaining section 140 then notifies the state determination section 150 of the receipt of the ON signal.

Upon receipt of the ON signal, supplied from the magnetic sensor C, from the second sensor information obtaining region 140, the state determination section 150 determines that the electronic dictionary 3 is in a photo frame state. Note that in a case where the state determination section 150 has not received the ON signal, it determines that the electronic dictionary 3 is not in a photo frame state.

Note that a detection sensitivity of the magnetic sensor C can be variable. In such a case, it is possible to adjust at what degree of strength of magnetic fields in a given direction the magnetic sensor C should respond and supply an ON signal.

In a case where the state determination section 150 can obtain, from the sensor information obtaining section 110, output signals of the respective magnetic sensors A and B, it can determine the state of the electronic dictionary 3 by taking into consideration the output signals. For example, the state determination section 150 first determines, based on the output signals of the respective magnetic sensors A and B, whether the electronic dictionary 3 is in a closed state, in an open state, or in a tablet state. In a case where the electronic dictionary 3 is in an open state, the state determination section 150 then determines, based on whether or not it has received an ON signal from the magnetic sensor C, whether the electronic dictionary 3 is in a photo frame state (particularly, of the open state) or in an open state.

Note also that the state detection sensor C can be an acceleration sensor. In such a case, the electronic dictionary 3 only need to include at least one acceleration sensor (hereinafter, referred to as an "acceleration sensor C") in at least one of the upper casing 10, the lower casing 20, and the hinge 30 (supporting section). The acceleration sensor C detects a direction of a casing in which the acceleration sensor C is included. The following description will illustrate a case where the acceleration sensor C is provided in the lower casing 20 on the premise that a normal position is on a side on which the keyboard 21 is provided.

Figure 20:
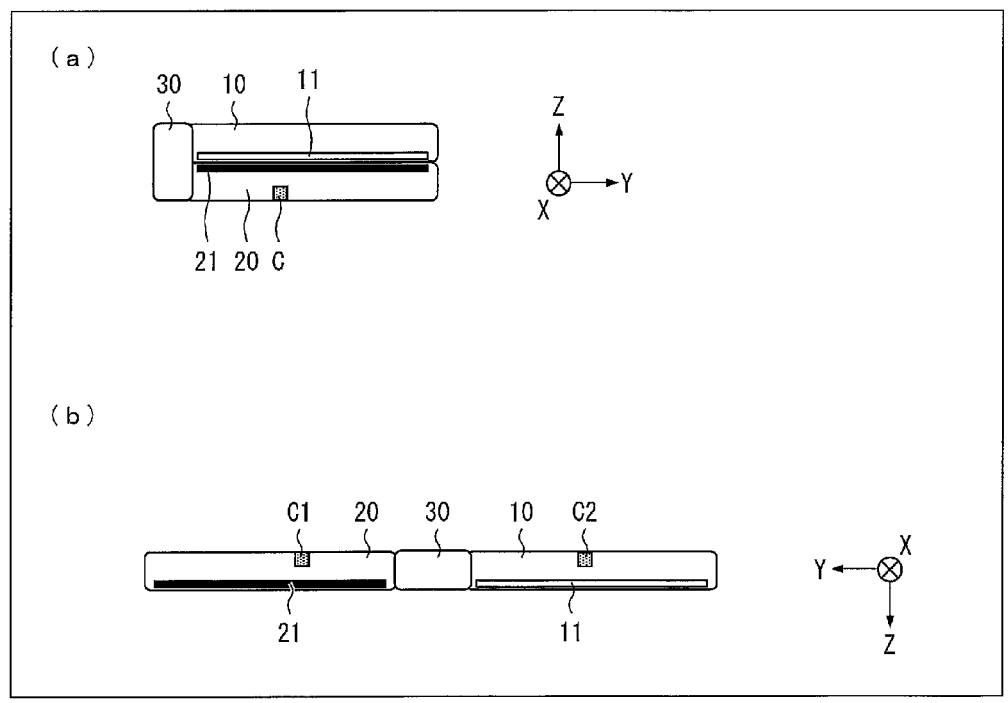
FIG. 20 is a set of views (a) and (b) each being a cross-sectional view of the electronic dictionary, as taken along the Y-Z plane, having an acceleration sensor provided in the lower casing and each illustrating a direction of the lower casing and a detection result (direction of lower casing) of the acceleration sensor.

Each of (a) and (b) of FIG. 20 is a cross-sectional view of the electronic dictionary 3, as taken along the Y-Z plane, including an acceleration sensor provided in the lower casing 20. Each of (a) and (b) of FIG. 20 illustrates a direction of the lower casing 20 and a detection result of the acceleration sensor (the direction of the lower casing 20). The state determination section 150 receives, from the second sensor information obtaining section 140, a detection result of the acceleration sensor. (a) of FIG. 20 illustrates a case where the detection result of the acceleration sensor C indicates that the direction of the lower casing 20 (keyboard 21) is an upward direction (a plus direction of a Z axis). In such a case, the state determination section 150 determines, based on the detection result of the acceleration sensor, that the electronic dictionary 3 is not in a photo frame state. In a case where the detection result of the acceleration sensor C indicates that the direction of the lower casing (keyboard 21) is a downward direction (a minus direction of the Z axis), the state determination section 150 determines that the electronic dictionary 3 is in a photo frame state. In such a case where the detection result of the acceleration sensor C indicates that the direction of the lower casing 20 (keyboard 21) is the downward direction (the minus direction of the Z axis), the state determination section 150 can further determine, based on detection results of the respective magnetic sensors A and B, whether the electronic dictionary 3 is in a photo frame state or in a tablet state.

Note that an acceleration sensor C can be provided in each of the upper casing 10 and the lower casing 20. In such a case, the state determination section 150 can determine, based on detection results of respective acceleration sensors C1 and C2, (i) a direction of the lower casing 20 and (ii) whether a direction of the upper casing 10 (touch panel 11) of the electronic dictionary 3 is an upward direction (the plus direction of the Z axis) or a downward direction (the minus direction of the Z axis). In a case where (i) the electronic dictionary 3 includes the acceleration sensors C1 and C2 and (ii) the state determination section 150 detects a state where, for example, the upper casing 10 is rotated by 180 degrees and is substantially flush with the lower casing 20 (i.e., the keyboard 21 and the touch panel 11 are horizontally aligned) as shown in (b) of FIG. 20 (hereinafter, referred to as a "horizontal state"), the state determination section 150 informs the input control section 131 that the electronic dictionary 3 is in the horizontal state. In a case where the state determination section 150 determines that the electronic dictionary 3 is in a horizontal state, the input control section 131 can enable entering via a keyboard.

In a case where the user operates the electronic dictionary 3 while, for example, lying, the user appears to maintain the electronic dictionary 3 to be in the horizontal state. In a case of the horizontal state, since the touch panel 11 (display section) and the keyboard 21 are flush with each other, the user is likely to use the keyboard 21 while maintaining the horizontal state. Therefore, by detecting a horizontal state and enabling entering via the keyboard in accordance with the horizontal state, it is possible to carry out input control by taking into consideration a user's intention to use the electronic dictionary 3.

The electronic dictionary 3 of Embodiment 7 needs to be detectable, as a photo frame state, at least a state where an angle of the upper casing 10 to the lower casing 20 is not smaller than 270 degrees and is not greater than 360 degrees. In other words, the state determination section 150 of the electronic dictionary 3 of Embodiment 7 can determine, as the photo frame state or not as the photo frame state, a state where the angle of the upper casing 10 to the lower casing 20 is greater than 180 degrees and smaller than 270 degrees.

The following description will discuss how the state detection sensor C is configured and how the state determination sensor 150 determines, in a case where a state, where an angle of the upper casing 10 to the lower casing 20 is not smaller than 270 degrees and is not greater than 360 degrees, is determined as the photo frame state.

In a case where the state detection sensor C of the electronic dictionary 3 is an angle sensor, the angle sensor can directly detect an angle of the upper casing 10 to the lower casing 20. The state determination section 150 can determine that the electronic dictionary 3 is in a photo frame state, in a case where an angle detected by the angle sensor falls within a predetermined range (e.g., a range from 270 degrees to 360 degrees). The state determination section 150 can thus determine a state of the electronic dictionary 3 in accordance with an angle itself (a detection result). This makes it possible to more accurately determine whether or not the electronic dictionary 3 is in a photo frame state (whether or not the angle falls within a predetermined range), as compared with a case where the magnetic sensor C is used (later described).

In a case where (i) the state detection sensor C is a magnetic sensor C and (ii) an angle of the upper casing 10 to the lower casing 20 is greater than 180 degrees and smaller than 270 degrees (see (c) through (e) of FIG. 19 and the descriptions thereof), as the angle becomes greater, magnetic fields generated by the magnet 15 contain a greater amount of magnetic fields that the magnetic sensor C can detect. Therefore, by adjusting the detection sensitivity of the magnetic sensor C, it is possible to set an angle at which the magnetic sensor C responds (supplies the ON signal), i.e., it is possible to set a threshold for determining whether or not the electronic dictionary 3 is in a photo frame state.

Note that a magnetic sensor and an acceleration sensor can be used, in combination, as the state detection sensor C. In such a case, the state determination section 150 determines that the electronic dictionary 3 is in a photo frame state, in a case where, for example, (i) a detection result of the acceleration sensor indicates that the keyboard 21 is in a downward direction (a minus direction of a Z axis) and (ii) the magnetic sensor outputs an ON signal.

In a case where the acceleration sensors C1 and C2 are used as the state detection sensor C as shown in FIG. 20, it is possible to detect an angle of the upper casing 10 to the lower casing 20, based on (i) a direction of the keyboard 21 which direction the acceleration sensor C1 has detected and (ii) a direction of the lower casing which direction the acceleration sensor C2 has detected. In such a case, the state determination section 150 therefore determines, as with the case where the state detection sensor C is an angle sensor, that the electronic dictionary 3 is in a photo frame state in a case where an angle calculated from detection results of the respective acceleration sensors C1 and C2 falls within a predetermined range.

[Example Realized by Software]

Each control block (particularly, the control section 100) of the electronic dictionaries 1 through 3 can be realized by a logic circuit (hardware) provided in an integrated circuit (IC chip) or the like or can be alternatively realized by software as executed by a CPU (Central Processing Unit).

In the latter case, each of the electronic dictionaries 1 through 3 includes a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

An electronic device (electronic dictionary 1) of Aspect 1 of the present invention includes: a first casing (upper casing 10), having a plate-like shape, including a magnet (magnet 12) having a magnetic axis (magnetic axis 12a) that passes through a south pole and a north pole of the magnet; and a second casing (lower casing 20), having a plate-like shape, including a magnetic detection section (magnetic sensors A and B) that detects magnetic fields generated by the magnet, a first state (closed state) indicating a state where a first surface of the first casing and a second surface of the second casing overlap each other, a second state (tablet state) indicating a state where a surface opposite to the first surface and a surface opposite to the second surface overlap each other, in each of the first state and the second state, the magnetic axis of the magnet being inclined with respect to the second surface of the second casing that faces the first casing.

According to the above configuration, the magnetic axis of the magnet is inclined with respect to the second surface of the second casing. This causes positions of magnetic field regions generated by the magnet inside the second casing to differ between in the first state and in the second state. The magnetic detection section thus can distinguish, based on the positions of the magnetic field regions generated inside the second casing, between magnetic fields generated in the first state and magnetic fields generated in the second state.

This makes it possible to determine, based on a detection result of the magnetic detection section, whether the electronic device is in the first state or in the second state.

Note that the magnetic field regions as used herein mean regions where the strength of magnetic fields exceeds a threshold of sensitivity of the magnetic detection section, or regions where the strength of magnetic fields in a given direction becomes not smaller than a given value.

In Aspect 2 of the present invention, the electronic device is arranged such that, in Aspect 1 of the present invention, the magnetic detection section includes two or more magnetic sensors including a first magnetic sensor (magnetic sensor A) and a second magnetic sensor (magnetic sensor B) and distinguishes first magnetic fields generated by the magnet in the first state from second magnetic fields generated by the magnet in the second state; the magnet causes at least two of a first region (closed state detection region), a second region (tablet state detection region), and a third region (dual state detection region) to be formed on the second casing and inside the second casing, the first region being a region where the first magnetic sensor responds in the first state but does not respond in the second state, the second region being a region where the second magnetic sensor does not respond in the first state but responds in the second state, the third region being a region where the first magnetic sensor or the second magnetic sensor respond(s) in both of the first state and the second state; and the first magnetic sensor and the second magnetic sensor are separately provided in the at least two of the first region, the second region, and the third region.

According to the above configuration, at least the first and second magnetic sensors respond differently to each other in accordance with regions in which they are provided. Further, the first and second magnetic sensors are separately provided in at least two of the first region, the second region, and the third region. This makes it possible to determine, at least based on responses of the first and second magnetic sensors, whether the electronic device is in the first state or in the second state.

In Aspect 3 of the present invention, the electronic device is arranged such that, in Aspect 2 of the present invention, at least one of the two or more magnetic sensors is provided substantially on the magnetic axis of the magnet in the first state or in the second state.

On the magnetic axis of the magnet, the strongest magnetic fields are generated. The magnetic sensor which is provided substantially on the magnetic axis of the magnet therefore can detect, with high accuracy, magnetic fields generated in the first state or magnetic fields generated in the second state.

In Aspect 4 of the present invention, the electronic device is arranged such that, in any one of Aspects 1 through 3 of the present invention, the first casing and the second casing are rotatably connected to each other via a connection section (hinge 30); and the magnetic detection section distinguishes between (i) magnetic fields generated by the magnet in the first state, (ii) magnetic fields generated by the magnet in the second state, and (iii) magnetic fields generated by the magnet in a third state (open state), the third state indicating a state where the electronic device is in transition from the first state to the second state or from the second state to the first state, in response to rotation of the first housing or the second housing.

According to the above configuration, the electronic device can further carry out control in accordance with the third state.

In Aspect 5 of the present invention, the electronic device is arranged to further include, in any one of Aspects 1 through 4 of the present invention, a control section (function control section 130) that controls the electronic device in accordance with a state of the electronic device, the state being determined based on the detection result of the magnetic detection section.

According to the above configuration, the control section controls the electronic device in accordance with whether the electronic device is in the first state or in the second state. This makes it possible to carry out control in accordance with a state (one of the first state and the second state, or one of the first state, the second state, and the third state) of the electronic device.

In Aspect 6 of the present invention, the electronic device is arranged to further include, in Aspect 4 of the present invention, a control section, a display section (touch panel 11) provided on the first surface of the first casing, and an operation section (keyboard 21), composed of a plurality of physical keys including a switching section (power key 21a), provided on the second surface of the second casing, the control section carrying out control in which (i) in a case where the electronic device is in the first state, the electronic device is powered off; (ii) in a case where the electronic device is in the second state, (a) the electronic device is powered on and (b) operations of the plurality of physical keys in the operation section are disabled except for operations of the switching section that switches on or off the electronic device; and (iii) in a case where the electronic device is in the third state, (a) the electronic device is powered on and (b) operations of all the plurality of physical keys are enabled.

According to the above configuration, the first casing includes the display section provided on its first surface, and the second casing includes the operation section provided on its second surface. In the first state, the display section and the operation section face each other and are covered by the first casing and the second casing. In view of this, the first state is likely to be a state where the electronic device is not used. Therefore, the control section powers off the electronic device in the first state. This reduces electric power consumed by the electronic device.

In the second state, the display section and the operation section are exposed and are located on sides, of the electronic device, opposite to each other. In view of this, in a case where, for example, the display section has a touch panel function, the second state is likely to be a state where a user is using the electronic device in a tablet mode or the user is browsing without carrying out an operation via the operation section. Further, in a case where the user holds the electronic device in the second state, he/she may accidentally carry out entering via the operation section. Therefore, in the second state, the control section powers on the electronic device and disables operations entered via the operation section except for those entered via the switching section that powers on and off the electronic device. The control section thus prevents, while the user is using the electronic device in the tablet mode or the user is only browsing, erroneous operations entered via keys other than the switching section that powers on and off the electronic device.

In the third state, the display section and the operation section are exposed. In view of this, the third state is likely to be a state where, for example, the operation section is operable and the display section can be browsed, i.e., a state where the electronic device is in a normal usage state. Therefore, in the third state, the control section powers on the electronic device and enables all operations entered via the keys of the operation section. This allows normal use of the electronic device.

In Aspect 7 of the present invention, the electronic device is arranged such that, in Aspect 2 or 3 of the present invention, the magnetic sensor is a hall sensor or an MR sensor.

In Aspect 8 of the present invention, the electronic device (electronic dictionary 3) is arranged to further include, in any one of Aspects 4 through 6 of the present invention, a display control section (display control section 132) that controls a display section (the display section of the touch panel 11) to display an image in a display direction that differs between in the second state and in the third state, the display section being provided on the first surface of the first casing.

According to the above configuration, the display control section can cause the display section to display an image in a proper display direction in accordance with a state of the electronic device. Note that the "proper display direction" as used herein means a direction that matches a direction in which the display section is oriented while the electronic device is being used by a user. The above configuration saves the user from the trouble of manually changing the display direction when changing the state of the electronic device while using it. This enhances convenience of the electronic device.

In Aspect 9 of the present invention, the electronic device is arranged such that, in Aspect 8 of the present invention, the display control section switches the display direction of the image after a given period of time has elapsed since the electronic device was changed from the second state to the third state or from the third state to the second state.

In a case where the given period of time has elapsed since the state of the electronic device was changed (i.e., in a case where the state of the electronic device has not been changed for the given period of time), the user has likely decided that he/she is to use the electronic device in a state that the electronic dictionary had before the state was changed. In view of this, the above configuration switches the display direction of the image after the given period of time has elapsed. Therefore, in a case where the user accidentally changes the state of the first casing and the second casing of the electronic device, it is possible to prevent the display direction of the image from changing one after the other.

In Aspect 10 of the present invention, the electronic device is arranged to further include, in Aspect 8 or 9 of the present invention, an operation detection section (control section 100) that detects a given operation carried out with respect to the electronic device, in a case where the operation detection section detects the given operation, the display control section keeping the display direction unchanged even if the electronic device is changed from the second state or the third state, the display direction being a direction that is in line with the state of the electronic device that has not been changed.

The given operation detected by the operation detection section as used herein means an operation (such as, for example, a touch on the touch panel) that a user is not likely to carry out when moving the first casing and/or the second casing to change the state of the electronic device. In other words, the given operation is an operation intentionally carried out by a user.

According to the above configuration, the display control section can detect an instruction operation intentionally carried out by a user (i.e., an operation for changing the state of the electronic device without changing the display direction). This allows the display section to display an image in a proper display direction.

In Aspect 11 of the present invention, the electronic device is arranged to further include, in any one of Aspects 4 through 6 and 8 through 10 of the present invention, at least one of (i) a sound input section (microphone 31) that accepts a sound input and (ii) a sound output section (speaker 41) that outputs a sound; and a sound input and output control section (sound input and output control section 133) that sets at least one of (a) an input level of the sound input section and (b) an output level of the sound output section so that the at least one of the input level and the output level differs between in the second state and in the third state.

In a case where a user is using the electronic device, a distance between a face (ear, mouth, etc.) of the user and the at least one of the sound input section and the sound output section differs between the second state and the third state of the electronic device.

According to the above configuration, the sound input and output control section appropriately sets, in accordance with whether the electronic device is in the second state or in the third state, at least one of the input level of the sound input section and the output level of the sound output section. Therefore, even in a case where the state of the electronic device is changed, it is possible to (i) record an utterance of the user at a proper sound level and/or (ii) output a sound at a sound level at which the user can easily listen to the sound.

In Aspect 12 of the present invention, the electronic device is arranged to further include, in Aspect 4 of the present invention, a first input disabling section (input control section 131), in a case where the electronic device is carrying out a given function in the second state, the first input disabling section keeping entering via an operation section (keyboard 21) disabled even if the electronic device is changed from the second state to another state, the operation section being provided on the second surface of the second casing.

The given function as used herein means a function (such as browsing of an image or a moving image) that does not request a user to carry out many operations. In a case where such a function is carried out, a user is less likely to carry out an entering operation via the operation section. Further, in a case where such a function is carried out in a state where, as with the second state, the operation section is less likely to be used, the user is least likely to carry out an entering operation via the operation section. Therefore, in a case where the electronic device is carrying out the given function in the second state, entering via the operation section is disabled even in a case where the state is changed from the second state. This prevents misrecognition of entering via the operation section that may be caused by a user when he/she accidentally moves the electronic device.

In Aspect 13 of the present invention, the electronic device is arranged to further include, in any one of Aspects 4 through 6 and 8 through 12, a fourth state detection section (state detection sensor C) that detects, as a fourth state (photo frame state), a state where, in the third state, an angle of the first surface of the first casing to the second surface of the second casing is not smaller than 180 degrees and not greater than 360 degrees.

Note that the angle of the first surface of the first casing to the second surface of the second casing is defined to become 0 degree when the first surface of the first casing and the second surface of the second surface face substantially parallel to each other.

According to the above configuration, the fourth state detection section can determine how a first surface of the first casing and a second surface of the second casing are located.

In Aspect 14 of the present invention, the electronic device is arranged to further include, in Aspect 13 of the present invention, a second input disabling section (input control section 131) that disables, in a case where the electronic device is in the second state or in the fourth state, entering via an operation section (keyboard 21) provided on the second surface of the second casing.

According to the above configuration, the second input disabling section disables entering via the operation section in the second state where a surface of the second casing on which surface the operation section is provided is exposed to an outside without overlapping the first casing, and/or the fourth state where a surface opposite to the surface on which the operation section is provided is less exposed to the outside than the surface on which the operation section is provided.

Therefore, in a case where the operation surface is exposed to an outside of the electronic device, the second input disabling section disables entering via the operation section so that an erroneous operation hardly occurs.

In Aspect 15 of the present invention, the electronic device is arranged such that, in Aspect 11 or 12 of the present invention, the fourth state detection section is an angle detection sensor that detects an angle of the first surface of the first casing to the second surface of the second casing.

In Aspect 16 of the present invention, the electronic device is arranged such that, in Aspect 11 or 12 of the present invention, the fourth state detection section is a magnetic sensor (magnetic sensor C) and is provided in any of the first casing, the second casing, and the connection section.

In Aspect 17 of the present invention, the electronic device is arranged such that, in Aspect 11 or 12 of the present invention, the fourth state detection section is an acceleration sensor (the acceleration sensor C or a combination of the acceleration sensors C1 and C2).

An electronic device (electronic dictionary 3) of Aspect 18 of the present invention is an electronic device in which a first casing (upper casing 10), having a plate-like shape, and a second casing (lower casing 20), having a plate-like shape, are rotatably connected to each other via a connection section (hinge 30) and which includes a fourth state detection section (state detection sensor C) that detects, as a fourth state (photo frame state), a state where an angle of a first surface of the first casing to a second surface of the second casing is greater than 180 degrees and not greater than 360 degrees.

Note that the angle of the first surface of the first casing to the second surface of the second casing is defined to become 0 degree when the first surface of the first casing and the second surface of the second surface face substantially parallel to each other.

According to the above configuration, the fourth state detection section can determine how a surface of the first casing and a surface of the second casing are located.

An electronic device (electronic dictionary 1) of Aspect 19 of the present invention includes: a first casing (upper casing 10), having a plate-like shape, including a magnet (magnet 12) having a magnetic axis (magnetic axis 12*a*) that passes through a south pole and a north pole of the magnet; and a second casing (lower casing 20), having a plate-like shape, including a magnetic detection section (magnetic sensors A and B) that detects magnetic fields generated by the magnet, a first state (closed state) indicating a state where a first surface of the first casing and a second surface of the second casing overlap each other, a second state (tablet state) indicating a state where a surface opposite to the first surface and a surface opposite to the second surface overlap each other, in each of the first state and the second state, the magnetic axis of the magnet being inclined with respect to the second surface of the second casing that faces the first casing, the magnetic detection section distinguishing between magnetic fields generated in the first state and magnetic fields generated in the second state.

According to the above configuration, the magnetic axis of the magnet is inclined with respect to the second surface of the second casing. This causes positions of magnetic field regions generated by the magnet inside the second casing to differ between in the first state and in the second state. The magnetic detection section thus can distinguish, based on the positions of the magnetic field regions generated inside the second casing, between magnetic fields generated in the first state and magnetic fields generated in the second state.

This makes it possible to determine, based on a detection result of the magnetic detection section, whether the electronic device is in the first state or in the second state.

Note that the magnetic field regions as used herein mean regions where the strength of magnetic fields exceeds a threshold of sensitivity of the magnetic detection section, or regions where the strength of magnetic fields in a given direction becomes not smaller than a given value.

In Aspect 20 of the present invention, the electronic device is arranged such that, in Aspect 19 of the present invention, the magnetic detection section includes two or more magnetic sensors including a first magnetic sensor (magnetic sensor A) and a second magnetic sensor (magnetic sensor B); the magnet causes at least two of a first region (closed state detection region), a second region (tablet state detection region), and a third region (dual state detection region) to be formed on the second casing and inside the second casing, the first region being a region where the first magnetic sensor responds in the first state but does not respond in the second state, the second region being a region where the second magnetic sensor does not respond in the first state but responds in the second state, and the third region being a region where the first magnetic sensor or the second magnetic sensor respond(s) in both of the first state and the second state; and the first magnetic sensor and the second magnetic sensor are separately provided in the at least two of the first region, the second region, and the third region.

According to the above configuration, at least the first and second magnetic sensors respond differently to each other in accordance with regions in which they are provided. Further, the first and second magnetic sensors are separately provided in at least two of the first region, the second region, and the third region. This makes it possible to determine, at least based on responses of the first and second magnetic sensors, whether the electronic device is in the first state or in the second state.

The electronic device of each aspect of the present invention may be realized by a computer. In this case, the present invention encompasses: a control program for the electronic device which program causes a computer to operate as each section (limited to software-implementable sections) of the electronic device so that the electronic device can be realized by the computer; and a computer-readable storage medium storing the control program therein.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is suitably applicable to a casing of an electronic device, particularly to an electronic device having two casings that are rotatably connected to each other.

REFERENCE SIGNS LIST

1 Electronic dictionary (electronic device)
10 Upper casing (first casing)
11 Touch panel (display section)
12 through 15 Magnet
12a Magnetic axis
20 Lower casing (second casing)
21 Keyboard (operation section)
21a Power key (switching section)
30 Hinge (connection section)
31 Microphone (sound input section)
41 Speaker (sound output section)
22 Substrate
100 Control section (operation detection section)
130 Function control section (control section)
131 Input control section (first input disabling section, second input disabling section)
132 Display control section
133 Sound input and output control section
A Magnetic sensor (magnetic detection section, first magnetic sensor)
B Magnetic sensor (magnetic detection section, second magnetic sensor)
C State detection sensor (fourth state detection section)

The invention claimed is:

1. An electronic device comprising:
a first casing, having a plate shape, including a magnet having a magnetic axis that passes through a south pole and a north pole of the magnet; and
a second casing, having a plate shape, including a magnetic sensor group that detects magnetic fields generated by the magnet, wherein
a first state indicates a state where a first surface of the first casing and a second surface of the second casing overlap each other,
a second state indicates a state where a surface opposite to the first surface and a surface opposite to the second surface overlap each other,
in each of the first state and the second state, the magnetic axis of the magnet is inclined with respect to the second surface of the second casing,
the magnetic sensor group includes two or more magnetic sensors including a first magnetic sensor and a second magnetic sensor, and distinguishes first magnetic fields generated by the magnet in the first state from second magnetic fields generated by the magnet in the second state,
the magnet generates a third region and at least one of a first region and a second region on the second casing and inside the second casing, the first region being a region where the first magnetic sensor responds in the first state but does not respond in the second state, the second region being a region where the second magnetic sensor does not respond in the first state but responds in the second state, and the third region being a region where the first magnetic sensor or the second magnetic sensor responds in both of the first state and the second state, and the first magnetic sensor and the second magnetic sensor are separately provided in the third region and the at least one of the first region and the second region, such that one of the first magnetic sensor and the second magnetic sensor is included in the third region.

2. The electronic device as set forth in claim 1, wherein:
at least one of the two or more magnetic sensors is provided substantially on the magnetic axis of the magnet in the first state or in the second state.

3. The electronic device as set forth in claim 1, wherein:
the first casing and the second casing are rotatably connected to each other via a connection section; and
the magnetic sensor group distinguishes between (i) magnetic fields generated by the magnet in the first state, (ii) magnetic fields generated by the magnet in the second state, and (iii) magnetic fields generated by the magnet in a third state,
the third state indicating a state where the electronic device is in transition from the first state to the second state or from the second state to the first state, in response to rotation of the first casing or the second casing.

4. The electronic device as set forth in claim 3, further comprising:
a processor;
a touch panel provided on the first surface of the first casing; and
a keyboard, including a plurality of physical keys including a switching section, provided on the second surface of the second casing,
the processor performs control in which:
(i) in a case where the electronic device is in the first state, the electronic device is powered off;
(ii) in a case where the electronic device is in the second state, (a) the electronic device is powered on and (b) operations of the plurality of physical keys in the keyboard are disabled except for operations of the switching section that switches on or off the electronic device; and
(iii) in a case where the electronic device is in the third state, (a) the electronic device is powered on and (b) operations of all the plurality of physical keys are enabled.

5. The electronic device as set forth in claim 3, further comprising:
a processor that controls a touch panel to display an image in a display direction that differs between in the second state and in the third state, the touch panel being provided on the first surface of the first casing.

6. The electronic device as set forth in claim 5, wherein:
the processor switches the display direction of the image after a given period of time has elapsed since the electronic device was changed from the second state to the third state or from the third state to the second state.

7. The electronic device as set forth in claim 5, wherein:
in a case where the processor detects a given operation performed with respect to the electronic device, the processor keeps the display direction unchanged even if the electronic device is changed from the second state or the third state, the display direction being a direction that is in line with the state of the electronic device that has not been changed.

8. The electronic device as set forth in claim 3, further comprising:
at least one of (i) a sound input section that accepts a sound input and (ii) a sound output section that outputs a sound; and
a processor that sets at least one of (a) an input level of the sound input section and (b) an output level of the sound output section so that the at least one of the input level and the output level differs between in the second state and in the third state.

9. The electronic device as set forth in claim 3, further comprising:
a processor, wherein
in a case where the electronic device is performing a given function in the second state, the processor keeps entering via a keyboard disabled even if the electronic device is changed from the second state to another state, the keyboard being provided on the second surface of the second casing.

10. The electronic device as set forth in claim 3, further comprising:
at least one of an angle detection sensor, a magnetic sensor, and an acceleration sensor that detects, as a fourth state, a state where, in the third state, an angle of the first surface of the first casing to the second surface of the second casing is not smaller than 180 degrees and not greater than 360 degrees.

11. The electronic device as set forth in claim 10, further comprising:
a processor that disables, in a case where the electronic device is in the second state or in the fourth state, entering via a keyboard provided on the second surface of the second casing.

12. The electronic device as set forth in claim 10, wherein:
the electronic device includes the angle detection sensor that detects the fourth state; and
the angle detection sensor detects an angle of the first surface of the first casing to the second surface of the second casing.

13. The electronic device as set forth in claim 10, wherein:
the electronic device comprises the magnetic sensor that detects the fourth state; and
the magnetic sensor is provided in any of the first casing, the second casing, and the connection section.

14. The electronic device as set forth in claim 10, wherein:
the electronic device includes the acceleration sensor that detects the fourth state.

\* \* \* \* \*